(12) United States Patent
Vranos

(10) Patent No.: US 9,230,344 B2
(45) Date of Patent: Jan. 5, 2016

(54) SOFTWARE, SYSTEM, AND METHOD OF CHANGING COLORS IN A VIDEO

(71) Applicant: Christopher Joseph Vranos, Charlton, MA (US)

(72) Inventor: Christopher Joseph Vranos, Charlton, MA (US)

( * ) Notice: Subject to any disclaimer, the term of this patent is extended or adjusted under 35 U.S.C. 154(b) by 501 days.

(21) Appl. No.: 13/694,807

(22) Filed: Jan. 8, 2013

(65) Prior Publication Data

US 2013/0207993 A1    Aug. 15, 2013

Related U.S. Application Data

(60) Provisional application No. 61/585,887, filed on Jan. 12, 2012.

(51) Int. Cl.

| | |
|---|---|
| G09G 5/02 | (2006.01) |
| G06T 11/00 | (2006.01) |
| H04N 21/4402 | (2011.01) |
| G06T 19/20 | (2011.01) |
| H04N 9/79 | (2006.01) |
| G11B 27/034 | (2006.01) |
| G06T 13/20 | (2011.01) |

(52) U.S. Cl.
CPC .............. *G06T 11/001* (2013.01); *G06T 19/20* (2013.01); *G11B 27/034* (2013.01); *H04N 9/79* (2013.01); *H04N 21/440263* (2013.01); *G06T 13/20* (2013.01)

(58) Field of Classification Search
None
See application file for complete search history.

(56) References Cited

U.S. PATENT DOCUMENTS

2006/0285134 A1* 12/2006 Viturro et al. .................. 358/1.9
2011/0274351 A1* 11/2011 Tsukada ........................ 382/167
2011/0298799 A1* 12/2011 Mariani et al. ................ 345/420

* cited by examiner

*Primary Examiner* — Mark Zimmerman
*Assistant Examiner* — Sarah Le

(57) ABSTRACT

A method of changing colors in a video comprises providing a paint map image video comprising multidimensional location information of spatial points of an animated object, providing a rendered replacement image video comprising visual colors, each visual color comprising a transparency and shades of multiple linearly independent colors, identifying a first replacement image location on the animated object in a frame of the replacement image video, the first replacement image location having a first visual color, identifying a first paint map image location corresponding to the first replacement image location in a corresponding frame of the paint map image video, the first paint map image location represented by a first spatial color, creating a color mapping function that maps the first spatial color to a different visual color, and providing an altered rendered replacement image video that has been rendered according to the color mapping function.

20 Claims, 16 Drawing Sheets
(15 of 16 Drawing Sheet(s) Filed in Color)

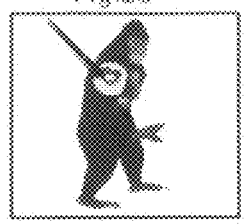
Fig.28
Fig.29
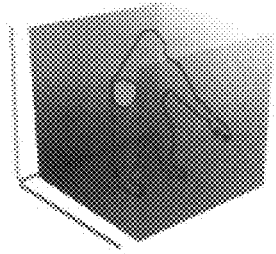 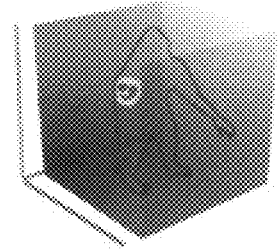
Fig.30  Fig.31
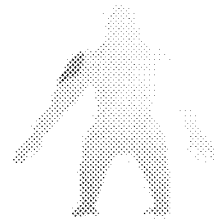   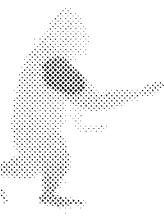 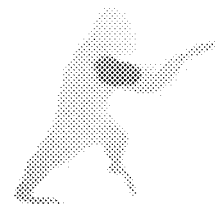
Fig.32  Fig.33  Fig.34  Fig.35  Fig.36
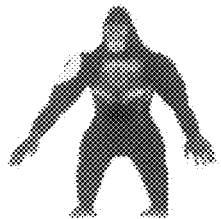   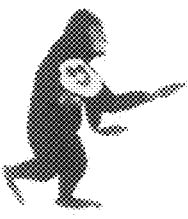 
Fig.37  Fig.38  Fig.39  Fig.40  Fig.41

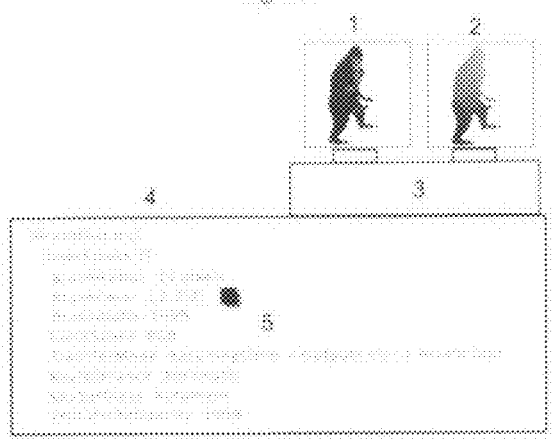
Fig.75
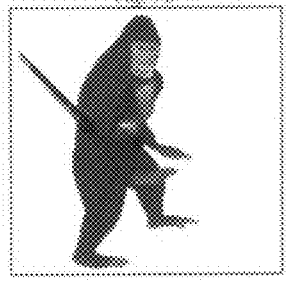
Fig.76
Fig.77
Fig.78 Fig.79 Fig.80 Fig.81 Fig.82
Fig.83 Fig.84
Fig.85
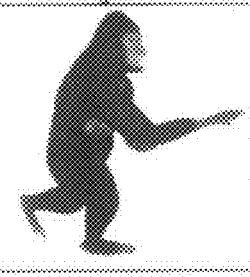
Fig.86
Fig.87 Fig.88 Fig.89 Fig.90
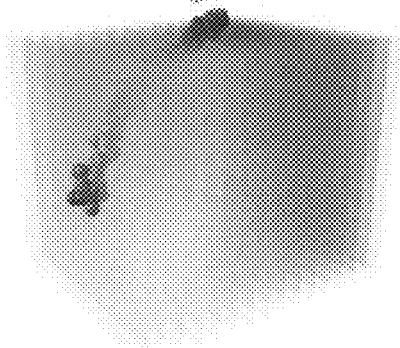
Fig.91

Fig.110
Fig.111 Fig.112
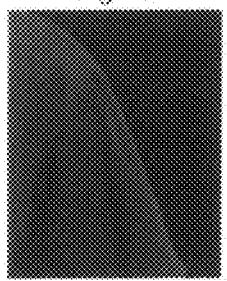 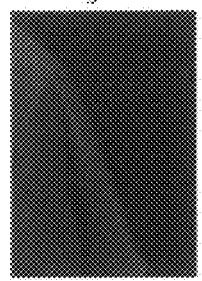
Fig.113 Fig.114
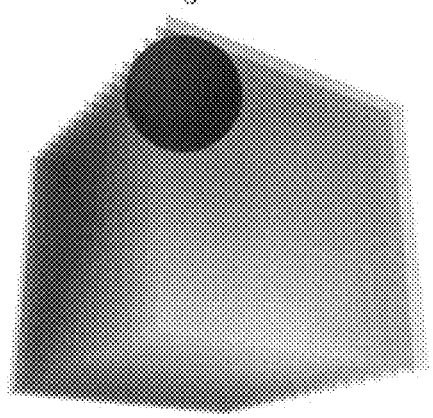 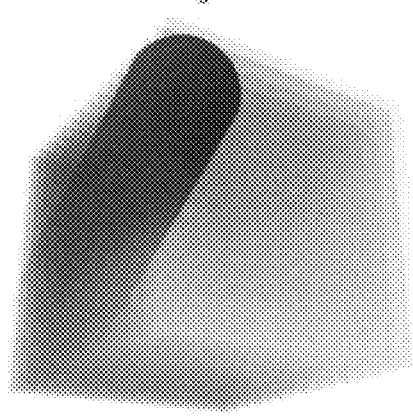
Fig.115 Fig.116

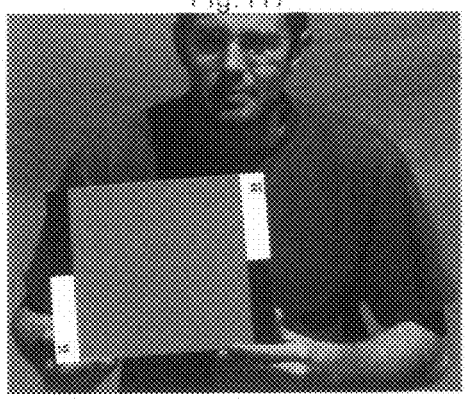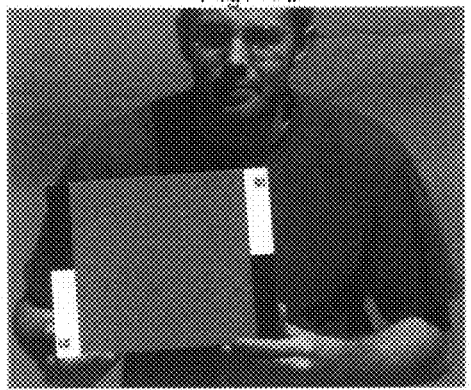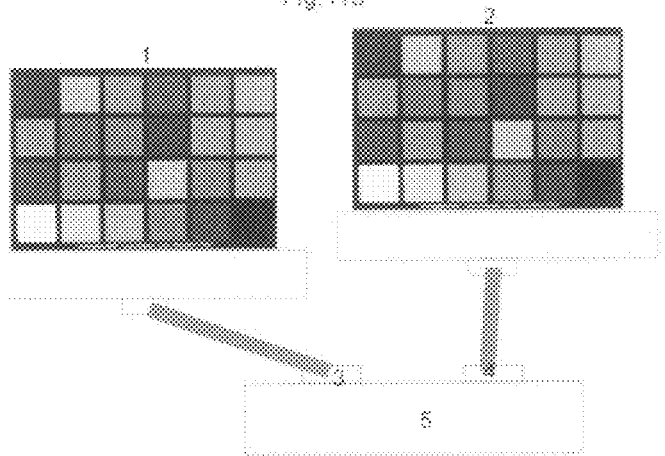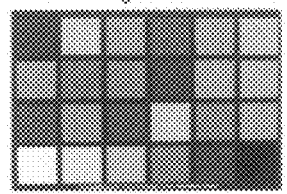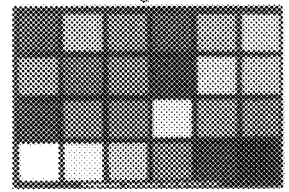

SOFTWARE, SYSTEM, AND METHOD OF CHANGING COLORS IN A VIDEO

REFERENCE TO RELATED APPLICATION

This application claims priority to U.S. Provisional Patent Application No. 61/585,887, filed Jan. 12, 2012, entitled, "METHOD AND APPARATUS FOR KEYING AND COLOR CORRECTION."

BACKGROUND OF THE INVENTION

The present invention relates to a software, system, and method of changing colors in a video.

Currently, changing colors in a video is a complex and time-intensive process. As can be seen, there is a need for solutions to these and other problems.

SUMMARY OF THE INVENTION

In one aspect of the present invention, a method of changing colors in a video comprises: providing a paint map image video comprising multidimensional location information of spatial points of an animated object in a multidimensional animation, the spatial points represented by different spatial colors, each spatial color comprising shades of multiple linearly independent colors, whereby each spatial point of the animated object is represented by a unique spatial color, and whereby successive frames of the paint map image video show animation of the animated object with changing multi-dimensional location information of the spatial points with the location information of the spatial points remaining spatially relative to the animated object; providing a rendered replacement image video that has been rendered from the multidimensional animation of the animated object, the rendered replacement image video comprising visual colors, each visual color comprising a transparency and shades of multiple linearly independent colors; identifying a first replacement image location on the animated object in a frame of the replacement image video, the first replacement image location having a first visual color; based at least in part on the step of identifying the first replacement image location, identifying a first paint map image location corresponding to the first replacement image location in a corresponding frame of the paint map image video, the first paint map image location represented by a first spatial color; creating a color mapping function that maps the first spatial color to a visual color different than the first visual color; and providing an altered rendered replacement image video that has been rendered according to the color mapping function.

In one aspect, the color mapping function maps the first spatial color to a visual color having a different transparency than the first visual color. In one aspect, the color mapping function maps the first spatial color to a visual color having zero transparency. In one aspect, the color mapping function maps the first spatial color to a visual color having a different shade of at least one of the multiple linearly independent colors than the first visual color. In one aspect, the multiple linearly independent colors comprise exactly three linearly independent colors. In one aspect, the color mapping function maps the first spatial color and all spatial colors within a color radius to at least one visual color different than the first visual color. In one aspect, the color radius is between approximately 0.01% and 1% of a maximum shade of one of the multiple linearly independent colors of the spatial colors. In one aspect, the method further comprises adjusting the color radius.

In one aspect, the color mapping function maps the first spatial color and all spatial colors within a color radius to at least one visual color different than the first visual color according to an attenuation that depends at least in part on a distance from the first spatial color. In one aspect, the color mapping function maps the first spatial color and all colors within a color radius to exactly one visual color different than the first visual color. In one aspect, the color mapping function maps the first spatial color and all colors within a color radius to a visual color that depends at least in part on a user-defined mathematical expression. In one aspect, the color mapping function comprises a hypercube or cube and maps the first spatial color and all colors within a three- or multi-dimensional closed shape within the hypercube or cube to at least one visual color different than the first visual color. In one aspect, the closed shape is created enclosing all points within a distance from a line segment. In one aspect, the color mapping function comprises a hypercube or cube and maps the first spatial color and all colors within a three- or multi-dimensional closed shape within the hypercube or cube to at least one visual color different than the first visual color according to an attenuation that depends at least in part on a distance the first spatial color. In one aspect, the closed shape is created enclosing all points within a distance from a line segment and the attenuation increases with increased distance from the line segment. In one aspect, the closed shape is created enclosing all points within a distance from a line segment and the attenuation increases from a beginning of the line segment to an end of the line segment. In one aspect, the three-dimensional location information of the spatial points of the animated object has a resolution, and wherein the color mapping function is smaller than a mapping function required to map all spatial colors at the resolution.

According to another aspect of the present invention, a system for changing colors in a video comprises: a machine; and a program product comprising machine-readable program code for causing, when executed, the machine to perform the method as disclosed.

According to another aspect of the present invention, a method of changing colors in a video comprises: providing a paint map image video comprising multidimensional location information of spatial points of an animated object in a multidimensional animation, the spatial points represented by different spatial colors, each spatial color comprising shades of multiple linearly independent colors, whereby each spatial point of the animated object is represented by a unique spatial color, and whereby successive frames of the paint map image video show animation of the animated object with changing three-dimensional location information of the spatial points with the location information of the spatial points remaining spatially relative to the animated object; providing a rendered replacement image video that has been rendered from the multidimensional animation of the animated object, the rendered replacement image video comprising visual colors, each visual color comprising a transparency and shades of multiple linearly independent colors; identifying a first replacement image location on the animated object in a frame of the replacement image video, the first replacement image location having a first visual color; creating a color mapping function that maps the first visual color to a second visual color different than the first visual color; and providing an altered rendered replacement image video that has been rendered according to the color mapping function.

In another aspect, the color mapping function maps all colors within a radius of a multidimensional line segment that spans between two multidimensional spatial points. In another aspect, attenuation increases based on the distance from the multidimensional line segment. In another aspect, attenuation increases from the beginning of the line segment to an end of a line segment. In another aspect, the color mapping function maps different visual colors at different positions along the line segment.

In another aspect, a method of changing colors in a video comprises: providing a paint map image video in which multidimensional color data may be re-interpreted as multidimensional location data, each color converted to an identical spatial location color comprising shades of multiple linearly independent colors, whereby each spatial point location may be used to contain visual color data; providing a rendered replacement image video comprising of visual colors, each visual color comprising shades of multiple linearly independent colors; identifying a first replacement image location of the video in a frame of the replacement image video, the first replacement image location having a first visual color; based at least in part on the step of identifying the first replacement image location, identifying a first paint map image location corresponding to the first replacement image location in a corresponding frame of the paint map image video, the first paint map image location represented by a first spatial color; creating a color mapping function that maps the first visual color to a second visual color different than the first visual color; and providing an altered rendered replacement image video that has been rendered according to the color mapping function.

These and other features, aspects and advantages of the present invention will become better understood with reference to the following drawings, description and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 28 shows the ReplacementImage loaded into the Viewer with the paint data painted on the ReplacementImage. The paint brush represents the user's mouse.

FIG. 29 shows the PaintMapImageColors that are relevant to placing the paint data to the look up table for the example presented between FIG. 1 and FIG. 41.

FIG. 30 shows the PaintMapImageColor's locations highlighted in the lookup table for the example presented between FIG. 1 and FIG. 41.

FIG. 31 shows the SentStrokes placed to the look up table in which the SentStrokes have been rendered according to their individual visual colors.

FIG. 32 shows the first frame of the PaintMapImage from the example presented by FIG. 1 through FIG. 41 so the PaintMapImageColors that are needed to store the paint data to the look up table are distinguishable from the rest of the PaintMapImageColors.

FIG. 33 shows the second frame of the PaintMapImage from the example presented by FIG. 1 through FIG. 41 so the PaintMapImageColors that are needed to store the paint data to the look up table are distinguishable from the rest of the PaintMapImageColors.

FIG. 33 shows the third frame of the PaintMapImage from the example presented by FIG. 1 through FIG. 41 so the PaintMapImageColors that are needed to store the paint data to the look up table are distinguishable from the rest of the PaintMapImageColors.

FIG. 34 shows the fourth frame of the PaintMapImage from the example presented by FIG. 1 through FIG. 41 so the PaintMapImageColors that are needed to store the paint data to the look up table are distinguishable from the rest of the PaintMapImageColors.

FIG. 35 shows the fifth frame of the PaintMapImage from the example presented by FIG. 1 through FIG. 41 so the PaintMapImageColors that are needed to store the paint data to the look up table are distinguishable from the rest of the PaintMapImageColors.

FIG. 37 shows the first frame of the Output created by the example shown with FIG. 1 through FIG. 41.

FIG. 38 shows the second frame of the Output created by the example shown with FIG. 1 through FIG. 41.

FIG. 39 shows the third frame of the Output created by the example shown with FIG. 1 through FIG. 41.

FIG. 40 shows the fourth frame of the Output created by the example shown with FIG. 1 through FIG. 41.

FIG. 41 shows the fifth frame of the Output created by the example shown with FIG. 1 through FIG. 41.

FIG. 75 shows the Vranos node with the Brush History tab attached.

FIG. 76 shows a UserStroke drawn to the Viewer based on the BrushSettings from FIG. 75.

FIG. 77 shows the character's PaintMapImage spatial color mapping in context to a the stretched color cube that was used to map the character for the example created by FIG. 75 through FIG. 90.

FIG. 78 is the first frame of a five frame contact sheet of the look up table for the paint example created by FIG. 75 through FIG. 90.

FIG. 79 is the second frame of a five frame contact sheet of the look up table for the paint example created by FIG. 75 through FIG. 90.

FIG. 80 is the third frame of a five frame contact sheet of the look up table for the paint example created by FIG. 75 through FIG. 90.

FIG. 81 is the fourth frame of a five frame contact sheet of the look up table for the paint example created by FIG. 75 through FIG. 90.

FIG. 82 is the fifth frame of a five frame contact sheet of the look up table for the paint example created by FIG. 75 through FIG. 90.

FIG. 83 is an image that helps put FIG. 78 through FIG. 82 into context by showing the PaintMapImageColors of the character over a frame of the contact sheet.

FIG. 84 is an image that helps put FIG. 78 through FIG. 82 into context by showing the ReplacementImageColors of the character over a frame of the contact sheet.

FIG. 85 shows the first frame of the Output in the example created by FIG. 75 through FIG. 90.

FIG. 86 shows the second frame of the Output in the example created by FIG. 75 through FIG. 90.

FIG. 87 shows the first frame of the PaintMapImage in the example created by FIG. 75 through FIG. 90.

FIG. 88 shows the first frame of the ReplacementImage in the example created by FIG. 75 through FIG. 90.

FIG. 89 shows the second frame of the PaintMapImage in the example created by FIG. 75 through FIG. 90.

FIG. 90 shows the second frame of the ReplacementImage in the example created by FIG. 75 through FIG. 90.

FIG. 91 shows a visualization of SentStrokes in a look up table.

FIG. 110 shows the footage that is input into both the ReplacementImage Input and the PaintMapImage input in the example created by FIG. 110 through FIG. 116.

FIG. 111 is the Output from the example created by FIG. 110, FIG. 111, FIG. 113, and FIG. 115.

FIG. 112 is the Output from the example created by FIG. 110, FIG. 112, FIG. 114, and FIG. 116.

FIG. 113 is the look up table for the example created by FIG. 110, FIG. 111, FIG. 113, and FIG. 115.

FIG. 114 is the look up table for the example created by FIG. 110, FIG. 112, FIG. 114, and FIG. 116.

FIG. 115 shows an image of the BrushSettings of the UserStroke used to create the SentStroke in FIG. 113.

FIG. 116 shows an image of the BrushSettings of the UserStroke used to create the SentStroke in FIG. 114.

FIG. 117 is an image in which the blue channel is disproportionate compared to the red and green channels in the gray card, and the goal is to use the software to correct it.

FIG. 118 is a color corrected version of FIG. 117.

FIG. 119 shows the Vranos Node™ configured to color grade a Macbeth color checker.

FIG. 120 shows the footage that is intended to be color corrected in the example presented by FIG. 119 through FIG. 121.

FIG. 121 shows the Macbeth color checker that contains the colors that FIG. 120 needs to match.

FIG. 122 shows the ReplacementImage in the Viewer in the example created by FIG. 122 through FIG. 149.

FIG. 123 shows the look up table holding the paint data for the example created by FIG. 122 through FIG. 149. In this figure, the look up table has no paint data, no UserStrokes have been drawn or applied to SentStrokes yet.

FIG. 124 shows the path of UserStroke1 represented by red in the example created by FIG. 122 through FIG. 149.

FIG. 125 shows the look up table for the example created by FIG. 122 through FIG. 149 at the time that UserStroke1 has been drawn, but not yet had SentStrokes created in the look up table.

FIG. 126 shows the Output in the Viewer after UserStroke1 has been applied in the example created by FIG. 122 through FIG. 149.

FIG. 127 shows the look up table after UserStroke1 has been applied in the example created by FIG. 122 through FIG. 149.

FIG. 128 shows a close up of the Output after UserStroke1 has been applied in the example created by FIG. 122 through FIG. 149.

FIG. 129 shows the path of UserStroke2 represented by red in the example created by FIG. 122 through FIG. 149.

FIG. 130 shows the look up table after UserStroke2 has been drawn but before it has been applied in the example created by FIG. 122 through FIG. 149.

Figure 131:

FIG. 131 shows the Output after UserStroke2 has been applied in the example created by FIG. 122 through FIG. 149.

Figure 132:
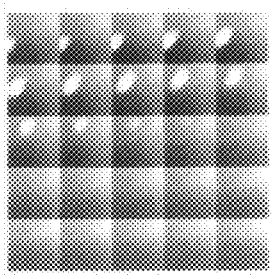

FIG. 132 shows the look up table after UserStroke2 has been applied in the example created by FIG. 122 through FIG. 149.

Figure 133:
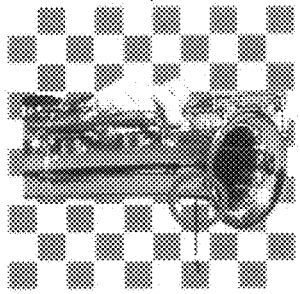

FIG. 133 shows the Output in close up after UserStroke2 has been applied in the example created by FIG. 122 through FIG. 149.

Figure 134:
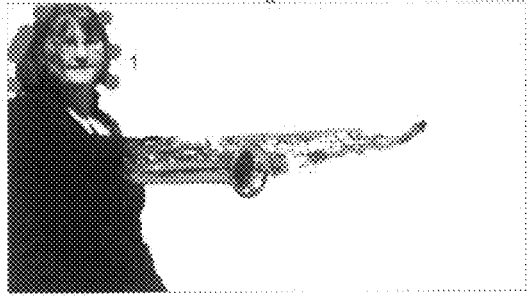

FIG. 134 shows the path of UserStroke3 in the example created by FIG. 122 through FIG. 149.

Figure 135:
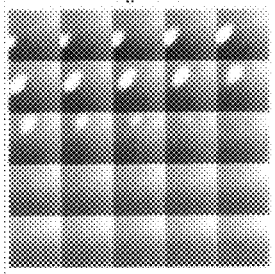

FIG. 135 shows the look up table after UserStroke3 has been drawn and before it has been applied in the example created by FIG. 122 through FIG. 149.

Figure 136:

FIG. 136 shows the Output after UserStroke3 has been applied in the example created by FIG. 122 through FIG. 149.

Figure 137:
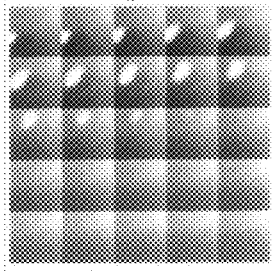

FIG. 137 shows the look up table after UserStroke3 has been applied in the example created by FIG. 122 through FIG. 149.

Figure 138:
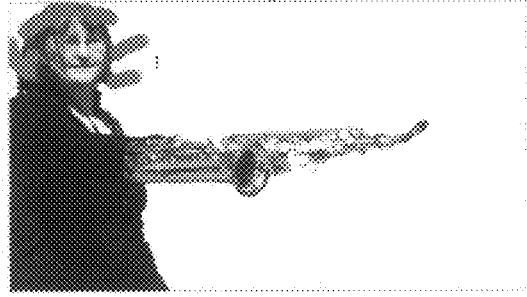

FIG. 138 shows the path of UserStroke4 in the example created by FIG. 122 through FIG. 149.

Figure 139:
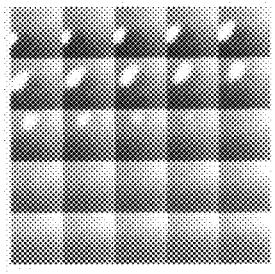

FIG. 139 shows the look up table after UserStroke4 has been drawn and before it has been applied in the example created by FIG. 122 through FIG. 149.

Figure 140:

FIG. 140 shows the Output after UserStroke4 has been applied in the example created by FIG. 122 through FIG. 149.

Figure 141:
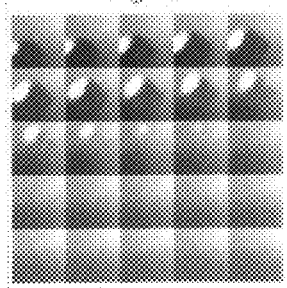

FIG. 141 shows the look up table after UserStroke4 has been applied in the example created by FIG. 122 through FIG. 149.

Figure 142:
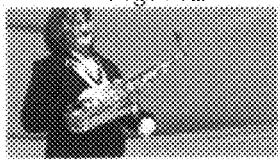

FIG. 142 is the first frame of the Replacement image in the example created by FIG. 122 through FIG. 149.

Figure 143:
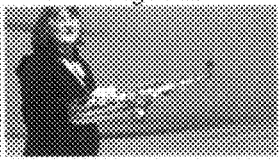

FIG. 143 is the second frame of the Replacement image in the example created by FIG. 122 through FIG. 149.

Figure 144:
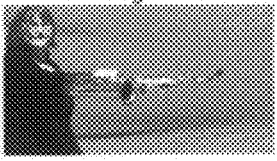

FIG. 144 is the third frame of the Replacement image in the example created by FIG. 122 through FIG. 149.

Figure 145:
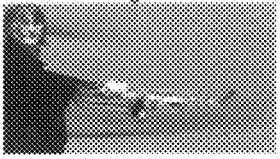

FIG. 145 is the fourth frame of the Replacement image in the example created by FIG. 122 through FIG. 149.

Figure 146:
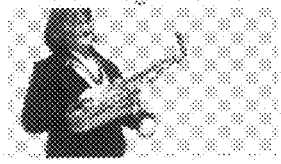

FIG. 146 is the first frame of the desired Output in the example created by FIG. 122 through FIG. 149. This image is achieved with the first three UserStrokes of the example.

Figure 147:
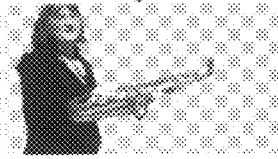

FIG. 147 is the second frame of the desired Output in the example created by FIG. 122 through FIG. 149. This image is achieved with the first three UserStrokes of the example.

Figure 148:
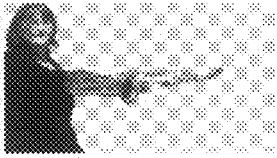

FIG. 148 is the third frame of the desired Output in the example created by FIG. 122 through FIG. 149. This image is achieved with the first three UserStrokes of the example.

Figure 149:
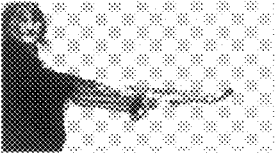

FIG. 149 is the fourth frame of the desired Output in the example created by FIG. 122 through FIG. 149. This image is achieved with the first three UserStrokes of the example.

Figure 150:
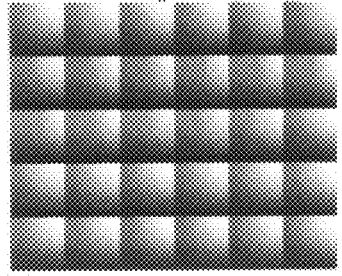

FIG. 150 is a contact sheet showing the HSV colorspace.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The Vranos Node™ is a node that allows the user to manipulate two dimensional image sequences for the purposes of Painting, Keying, and Color Correction. Below explains how it is used for painting. The term image sequence and video are interchangeable because they contain the same information.

Figure 1:
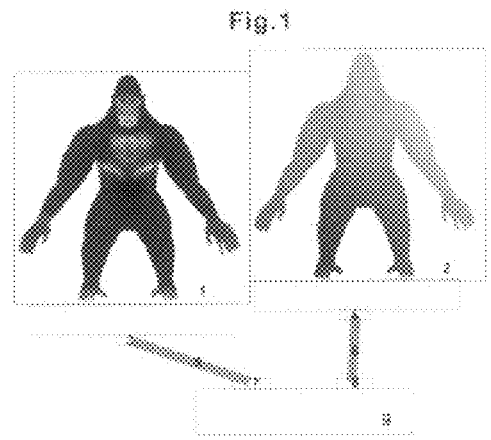
FIG. 1 shows the software's configuration as a node.

The Vranos Node™ (#9 of FIG. 1) has two main inputs, the PaintMapImage (#2 of FIG. 1) and the ReplacementImage (#1 of FIG. 1).

The primary, but not only purpose of the software when used for painting is to take a video of computer generated imagery, and make it possible to paint on a single frame of the video, and to have the paint apply to every other frame in the video. To paint new texture to a replacement image video, it is necessary to also use a paint map image, which will often be a coordinate pass, or UV pass. The replacement image video is often a diffuse pass. The replacement image video is the video or image sequence that will be painted on, input into the ReplacementImage input. The paint map image video provides the data for the multidimensional positions of the character where paint will stick. The paint map image video is input into the PaintMapImage. The qualities desired in the paint map image video will be described in greater detail further in the document.

1 of FIG. 1 is file read node containing the diffuse pass. A read node is a common method of importing an image sequence into software in node based compositing. This diffuse pass will be used as a replacement image video and will be input into the ReplacementImage input.

2 of FIG. 1 is file read node containing the coordinate pass.

3 of FIG. 1 is an output of a read node.

4 of FIG. 1 is an output of a read node.

Line #5 of FIG. 1 shows the connection from a read node's output to the Vranos Node™'s input.

Line #6 of FIG. 1 shows the connection from a read node's output to the Vranos Node™'s input.

7 of FIG. 1 is the ReplacementImage Input of the Vranos Node™.

8 of FIG. 1 is the PaintMapImage Input of the Vranos Node™.

9 of FIG. 1 is the Vranos Node™.

FIG. 3, FIG. 4, FIG. 5, FIG. 6, and FIG. 7 represent an image sequence of a CG character that has been input into the Replacement Image input. The first frame is FIG. 3, the second frame is FIG. 4 and so on until the last frame of FIG. 7. In this image sequence the character goes from standing to running.

This five frame image sequence will be loaded into the software via a read node (FIG. 1 #1). The node will be input into the ReplacementImage input. The 5 figures, which represent 5 frames of the image sequence have been laid out horizontally for examples sake, but they represent an image sequence of five frames. In this example, the user would like to paint a tattoo to the character's shoulder.

Using the Vranos Node™, the user may paint onto any frame of the ReplacementImage, and the tattoo will be applied to the character in every other frame.

Figure 9:
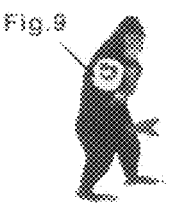
FIG. 9 shows the second frame of the replacement image as it has been painted in the viewer by the user before the Output has been created by the software in the example created by FIG. 1.
Figure 10:
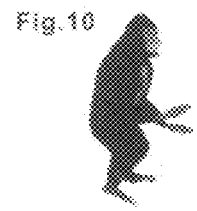
FIG. 10 shows the Output of the third frame that is first generated by the software before the paint data has been applied to the entirety of the image sequence in the example created by FIG. 1.
Figure 11:
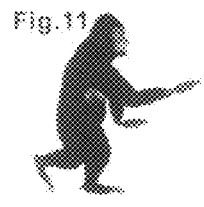
FIG. 11 shows the Output of the fourth frame that is first generated by the software before the paint data has been applied to the entirety of the image sequence in the example created by FIG. 1.
Figure 12:
FIG. 12 shows the Output of the fifth frame that is first generated by the software before the paint data has been applied to the entirety of the image sequence in the example created by FIG. 1.
Figure 13:
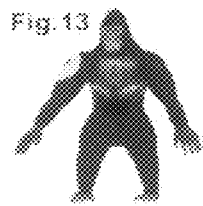
FIG. 13 shows the first frame of the Output once the paint data has been applied to the entirety of the ReplacementImage in the example created by FIG. 1.
Figure 14:
FIG. 14 shows the second frame of the Output once the paint data has been applied to the entirety of the ReplacementImage in the example created by FIG. 1.
Figure 15:
FIG. 15 shows the third frame of the Output once the paint data has been applied to the entirety of the ReplacementImage in the example created by FIG. 1.
Figure 16:
FIG. 16 shows the fourth frame of the Output once the paint data has been applied to the entirety of the ReplacementImage in the example created by FIG. 1.
Figure 17:
FIG. 17 shows the fifth frame of the Output once the paint data has been applied to the entirety of the ReplacementImage in the example created by FIG. 1.
Figure 18:
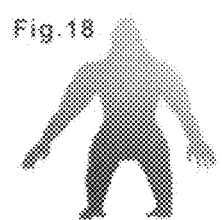
FIG. 18 shows the first frame of the PaintMapImage for the example created by FIG. 1.
Figure 19:
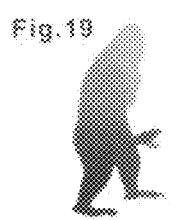
FIG. 19 shows the second frame of the PaintMapImage for the example created by FIG. 1.
Figure 20:
FIG. 20 shows the third frame of the PaintMapImage for the example created by FIG. 1.
Figure 21:
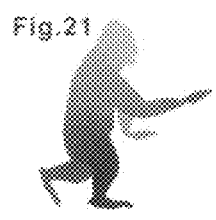
FIG. 21 shows the fourth frame of the PaintMapImage for the example created by FIG. 1
Figure 22:
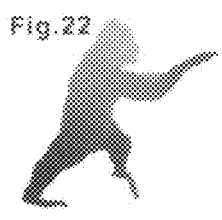
FIG. 22 shows the fifth frame of the PaintMapImage for the example created by FIG. 1.

FIG. 8 through FIG. 12 represent the 5 frame image sequence after the user has began painting to the second frame, the second frame represented by FIG. 9.

The user paints a tattoo onto the character's shoulder of the diffuse pass on the second frame, (FIG. 9). The user may paint to any frame. The second frame, (FIG. 9) was chosen just to show the user does not have to paint to the first frame.

The result is that an Output will be created in which the tattoo is placed in every frame of the ReplacementImage, as seen in a contact sheet created by FIG. 13, FIG. 14, FIG. 15, FIG. 16 and FIG. 17, which represent the five frames of the image sequence after the paint data has been applied.

The Vranos Node™ makes this possible because the PaintMapImage holds spatial color coordinates for the paint to stick. In the coordinate pass which has been input into the PaintMapImage, every surface point sampled on the character's body has unique multidimensional color data. When the user paints the tattoo, the tattoo is stored as paint data in a look up table based on the PaintMapImage's spatial colors. Then this data is retrieved to modify every frame of the ReplacementImage. The image sequence of the PaintMapImage in this example can be seen in as a five frame contact sheet made up of FIG. 18, FIG. 19, FIG. 20, FIG. 21, and FIG. 22.

Figure 23:
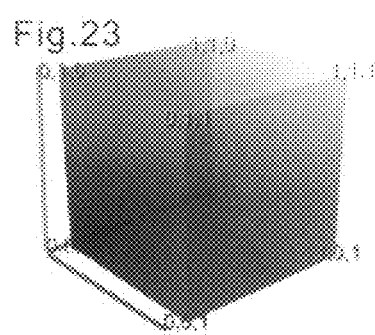
FIG. 23 shows a perspective view visualization of the three dimensional look up table.

In order to apply this tattoo from one frame of the diffuse pass to all of the rest, the tattoo must be stored as paint data to a look up table. When both inputs have three dimensions of color, the paint data in the look up table can be visualized in the form of three dimensional spheres. FIG. 23 shows the look up table.

The paint is placed to the look up table based on what color the body part is in the PaintMapImage.

Figure 24:
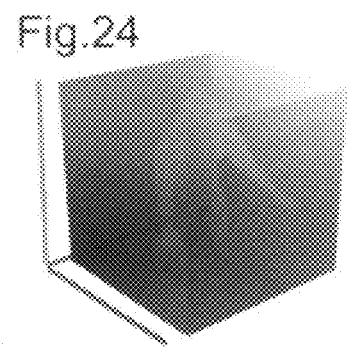
FIG. 24 shows a perspective view visualization of the look up table from the example demonstrated between FIG. 1 and FIG. 41 in a manner in which the image has been rendered so the spatial color coordinates of the PaintMapImage can be seen in three dimensional relation to the look up table.
Figure 25:
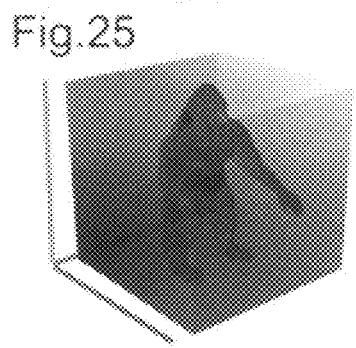
FIG. 25 shows a perspective view visualization of the look up table from the example demonstrated between FIG. 1 and FIG. 41 in a manner in which the image has been rendered so the visual colors of the ReplacementImage are placed at the three dimensional coordinates in the look up table matching the three dimensional coordinates of each visual color of the three dimensional computer generated character from which the ReplacementImage was rendered by the three dimensional rendering software.
Figure 26:
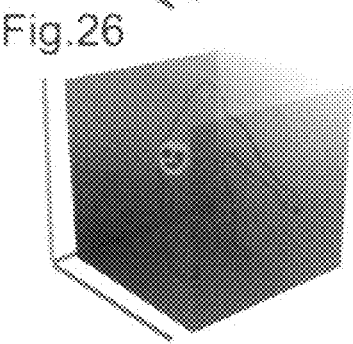
FIG. 26 shows a perspective view visualization of the look up table from the example demonstrated between FIG. 1 and FIG. 41 in which the paint data is placed in the look up table and rendered according to it's visual color.

FIG. 24 highlights every spatial color of the character at its position in the look up table. FIG. 25 shows where the matching visual colors of the ReplacementImage would be placed in the look up table if each visual color were assigned a position based on its corresponding PaintMapImage spatial color. FIG. 26 shows the visual colors of the tattoo at their newly assigned spatial color locations within the look up table. (There is a faint black outline in FIG. 26 only for the purposes of showing the tattoo's spatial relationship between the unpainted parts of the body) The tattoo stored as paint data is stored as tiny spheres called SentStrokes.

The look up table is a collection of SentStrokes. SentStrokes are the combination of spatial colors taken from the PaintMapImage, and visual colors taken from the ReplacementImage. SentStrokes contain more data which will be addressed in greater detail further in the document.

The spatial color is the multidimensional coordinate of the SentStroke in the look up table, the visual color is the multidimensional color data held at the spatial color's position.

The difference between a visual color and a spatial color is how the two are used.

A visual color refers a color that's purpose is to be seen. Visual colors make up the ReplacementImage and the Output. A visual color will be found in the video the user wishes to manipulate, and a visual color is the result of the manipulation.

A spatial color refers to color used to position visual colors in their correct places in the look up table. A spatial color is used to find the correct visual color paint data in the look up table to modify the colors of the ReplacementImage or Output.

Spatial colors and Visual colors may consist of multiple dimensions of real number data.

Colors are the sum of one or more linearly independent colors. Although colors are most often represented with three channels, red, green, and blue, they may have an unlimited number of channels.

Spatial colors and visual colors may both have an unlimited number of channels.

Figure 122:
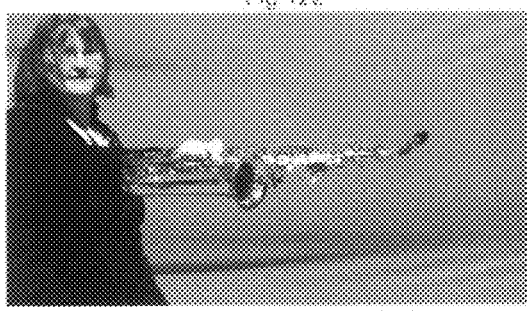

In some cases, as demonstrated in the example presented between FIG. 122 and FIG. 149, a single video will be used for both the PaintMapImage and the ReplacementImage. In this case, the spatial colors and visual colors are exactly the same, because they are taken from the same source. The spatial color is the coordinate of the SentStroke, the visual color is the paint data, however the term spatial color or visual color may also be used to help explain how colors from other sources are used.

A color is referred to as either a spatial color or a visual color based on how it is used within the software, but there is no actual difference between the two in terms of what data may make up a visual color or spatial color. The colors are labeled as such when it is helpful to explain what they are being used for. The use of the term spatial color or visual color when used outside of the context of a SentStroke should not be taken in a limiting sense, but used only descriptively for clarification.

To create an Output, when any spatial color in the PaintMapImage falls within the radius of a SentStroke's spatial color, the visual colors of the SentStroke will interact with the ReplacementImage's visual color to make an Output. This process will be shown using FIG. 27 through FIG. 41.

Figure 27:
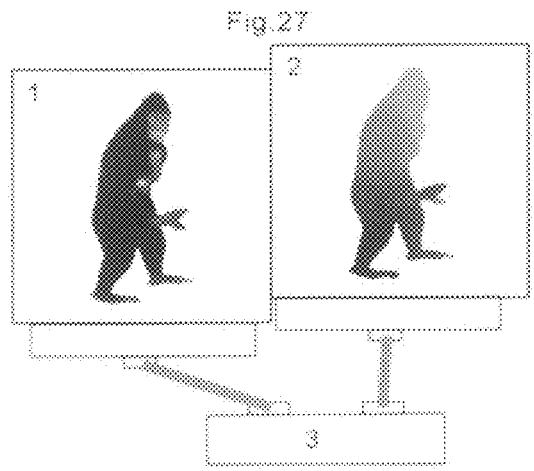
FIG. 27 shows the node as referenced in FIG. 1 except with the second frame of the example visible in the inputs.

1) The user inputs a diffuse pass of visual colors into the ReplacementImage Input, shown in FIG. 27 #1.

2) The user inputs a coordinate pass of spatial colors into the PaintMapImage Input shown in FIG. 27 #2.

FIG. 27 #3 represents the Vranos Node™.

3) The user loads the ReplacementImage into the Viewer, and paints a tattoo of visual colors to the character (FIG. 28).

4) The spatial colors of the PaintMapImage which correspond with the visual colors of the ReplacementImage are identified. (FIG. 29).

5) At the coordinates of the spatial colors selected in FIG. 29, the tattoo is placed to the look up table as SentStrokes (FIG. 31). The coordinates of the spatial colors selected in FIG. 29 can be seen in the look up table in FIG. 30. (the black outlines in the two figures are intended to put the position of the character into context)

6) After painting is finished, to create an Output, any spatial colors of the PaintMapImage that fall in the look up table inside radius of the of the SentStrokes are found. The spatial colors that are within range of the SentStrokes in FIG. 30 are found in PaintMapImage. Five frames of the Paint Map Image are shown in FIG. 32, FIG. 33, FIG. 34, FIG. 35 and FIG. 36. In these figures, the spatial colors that are within the range of the SentStrokes of FIG. 30 are highlighted.

7) The coordinates of these spatial colors are found in the look up table, and the visual color residing at that coordinate may partially or fully replace the visual colors of the ReplacementImage to create an Output. In this example, the visual colors are fully replaced. The example presented using FIG. 94 through FIG. 102 will explain different color interactions, which will be explained further in the document.

The result is the tattoo is painted over the diffuse pass in the Output, as seen in FIG. 37, FIG. 38, FIG. 39, FIG. 40, and FIG. 41. These five figures represent five frames of the output that has been generated based on the painting example described above.

The example described above has been a simple outline, omitting finer details and additional possibilities for simplicity's sake, and for ease of understanding. Below will include more detail and additional features.

The PaintMapImage in Detail:

The PaintMapImage is an image that is typically from three dimensional rendering software. It is a two dimensional image sequence or video, and its intended purpose is to create spatial color coordinates by which digital paint will stick. It would be advantageous for each frame of the PaintMapImage to only have one instance of each spatial color because the Vranos Node™'s look up table only yields one visual color look up value for each spatial color coordinate. Having at most one instance of each color per frame is advantageous because an individual visual color may be assigned for each spatial color.

Note: These rules are guidelines for using the software to paint. The PaintMapImage may be any image sequence. It may have multiple instances of the same spatial colors, for example a green screen shot that must be keyed. It also may be advantageous to have the same spatial colors for objects that will receive the same paint job. For example, if five computer generated soldiers will need the same exact uniform painted on them, it would make sense to give them matching spatial color renders.

It is important to emphasize that the image input into the PaintMapImage will make up spatial colors, however there are no restrictions on what type of image may be used for the PaintMapImage.

Figure 42:
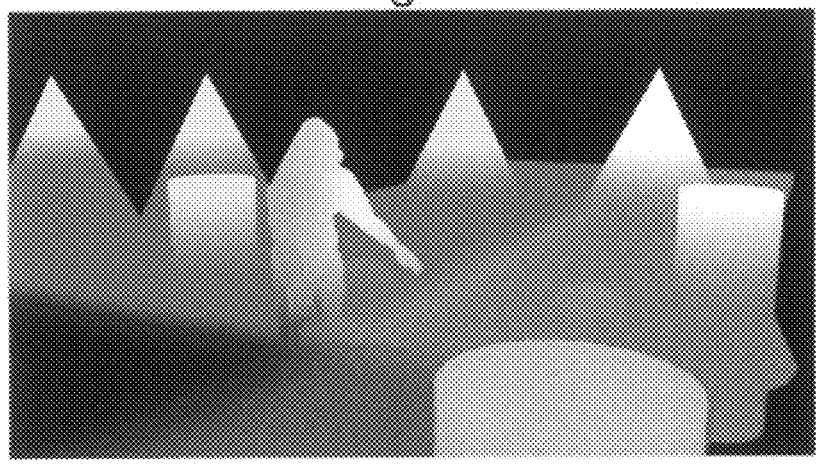
FIG. 42 shows a possible PaintMapImage in which the spatial color coordinates are created based on the first three dimensional spatial location of the geometry in the scene before any animation takes place.
Figure 43:
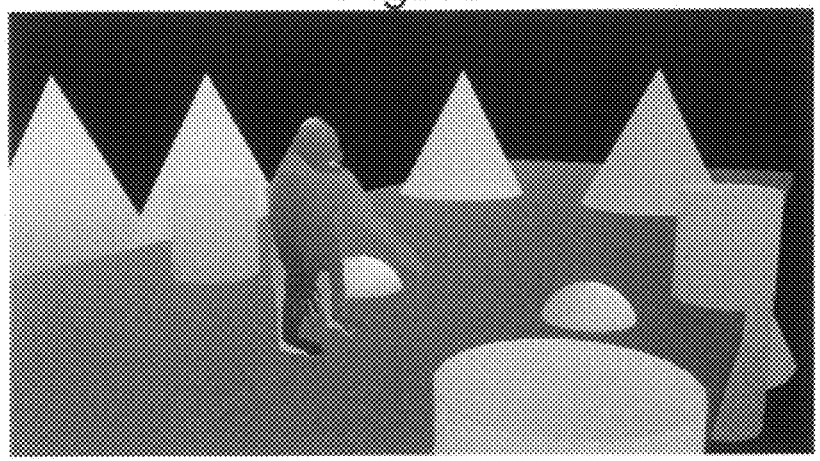
FIG. 43 shows a possible PaintMapImage in which the spatial colors are created using a UV render pass.

FIG. 42 and FIG. 43 are examples of possible desirable PaintMapImages for CG painting.

FIG. 42 is ideal because every spatial color is unique in the scene. Each object in the scene is colored according to its starting spatial position in the scene before animation. As each object moves, the color remains attached to the object.

The colors may be designated with any real number value. The look up table in FIG. 23 only shows values between 0 and 1, however SentStrokes can accept spatial color values of any real numbers, positive or negative, greater than 1, lower than 0, and all decimal places in between. The user may wish to create a coordinate pass in which the origin of the scene is 0,0,0 in meters, and the objects are colored with metric values. FIG. 42 may appear to have multiple instances of the same spatial color, however it does not. The colors that look like duplicates are either negative values, which are represented as black, or positive values greater than one, which are visualized by showing the value at 1 no matter how high the value becomes.

FIG. 42 shows only three channels of color used for the PaintMapImage, however using four, five or more may also have its advantages. For example, the user may assign each character red, green, and blue values for the basic three dimensional positions. They may then make a fourth channel that holds different values for each individual character in the scene, categorizing the characters by number. They may then make a fifth channel that holds different values for each piece of clothing on each character in the scene, categorizing the character's articles of clothing by number. Although the expectation is that most of the channels input into the PaintMapImage are going to be related to position, channels providing categorization are just as useful and valid. The user may also wish to include a channel which is based on proximity, for example the distance between a character and a light in the scene.

Additional channels may include other rendered data for other purposes. The user may include lighting data, material data, etc. . . . . These additional channels may be used for creative purposes, perhaps making a paint selection on objects of a certain material while under a certain brightness of light, and on a certain article of clothing. The PaintMapImage should not be considered limited to only spatial coordinates, spatial coordinates just happen to be the most practical way to think about how to select or paint an object.

A spatial color may have an unlimited number of channels, making very specific and creative selections possible.

Figures 44, 45:
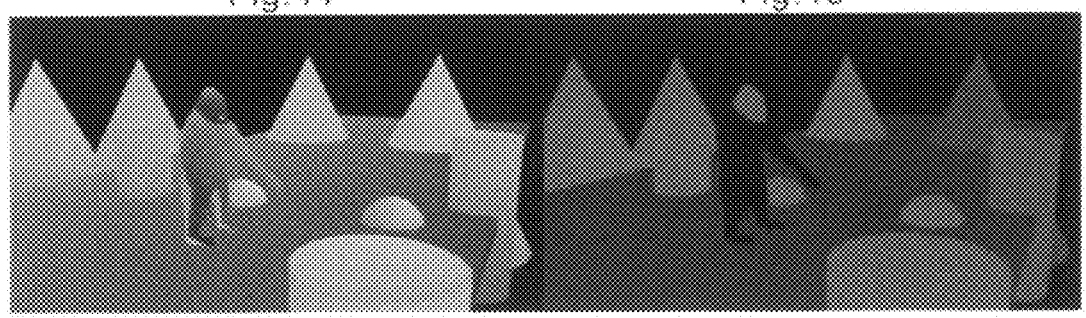
FIG. 44 shows the red and green channels of FIG. 43.
FIG. 45 shows the blue channel of FIG. 43.

FIG. 43 is also an ideal image for painting. It is essentially a UV pass, however separate objects are categorized by varying Values of blue. In this example, the character's head and body are separate objects with their own UV passes. The objects also have their own UVs, and their own shade of blue. This is made easier to see in FIG. 44 and FIG. 45, in which the three channels have been separated. FIG. 44 is the regular UV pass on the red and green channels. FIG. 45 shows the objects categorized by different blue values.

Figure 46:
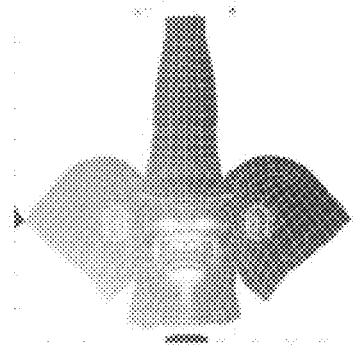
FIG. 46 shows the UV layout of the head of the character from FIG. 43.
Figure 47:
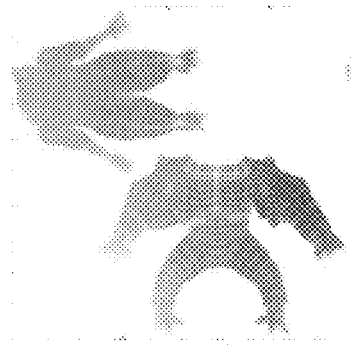
FIG. 47 shows the UV layout of the body of the character from FIG. 47.
Figure 48:
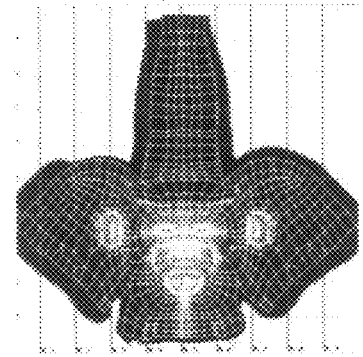
FIG. 48 shows the texture of the head of the character from FIG. 43 flattened to a UV texture map with the wire frame of the mesh super imposed.
Figure 49:
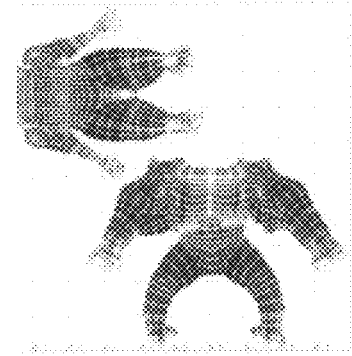
FIG. 49 shows the texture of the body of the character from FIG. 43 flattened to a UV texture map with the wire frame of the mesh superimposed.
Figure 50:
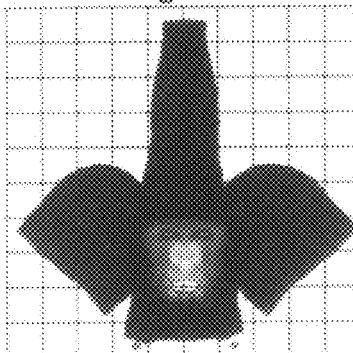
FIG. 50 shows the texture of the head of the character from FIG. 43 flattened to a UV texture map.
Figure 51:
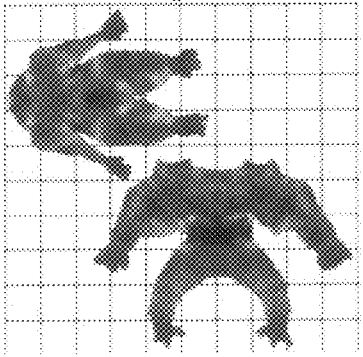
FIG. 51 shows the texture of the body of the character from FIG. 43 flattened to a UV texture map.

As is standard with UV passes, the U value is assigned to red, and the V value is assigned to green. (FIG. 46 and FIG. 47 show UV maps for the head and body.) By separating each object's UV pass in the scene with a different value of blue, the user may paint every object in the scene individually. FIG. 48, FIG. 49, FIG. 50 and FIG. 51 help clarify how the character's texture is applied to the polygonal mesh of the three dimensional character.

Figure 52:
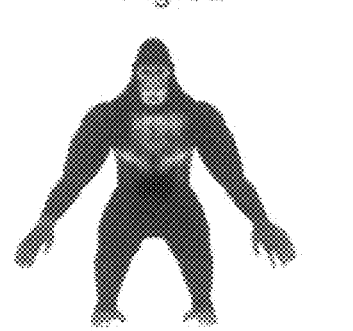
FIG. 52 shows a desirable rendering style of the ReplacementImage.
Figure 53:
FIG. 53 shows another desirable rendering style of the ReplacementImage.

The ReplacementImage is whatever the user chooses, typically an image of a CG character matching the PaintMapImage. It is most likely a diffuse pass (FIG. 52), which shows pure texture without lighting, however may also be a beauty pass (FIG. 53) depending on the user's preference. The ReplacementImage is the image or image sequence the user actually wants to paint. There are no limitations to what the user chooses for the ReplacementImage. The same video may be used in either the ReplacementImage input or the PaintMapImage input depending on the intentions of the user, however both inputs accept videos with multiple channels of real numbers.

Description in Greater Detail:

As is demonstrated with FIG. 54 through FIG. 63, the goal is for the user to paint texture to the diffuse pass, and to use the PaintMapImage to allow the paint to stick correctly to the diffuse pass over the entire image sequence when output. This is the same process as described with the tattoo above, however will get much more in depth as it is described.

Figure 59:
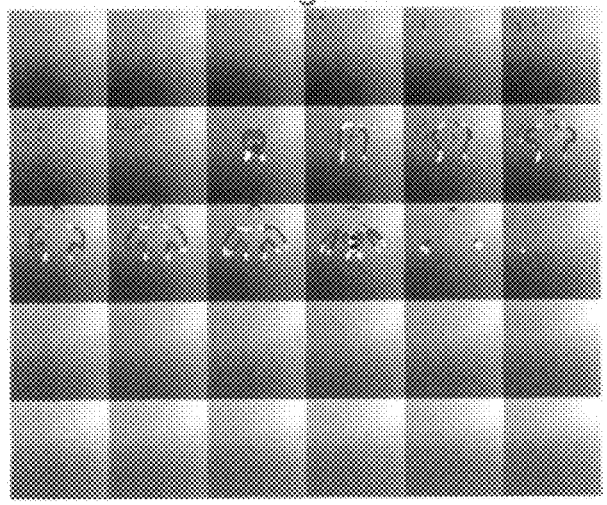
FIG. 59 shows the look up table from FIG. 56 in the form of a contact sheet.

The look up table (FIG. 56) is represented by a contact sheet FIG. 59, which will be the way the Vranos paint system represents multidimensional look up tables. A contact sheet is just a two dimensional image used to represent the entirety of either an image sequence, or a multidimensional object or image.

Figures 54, 55:
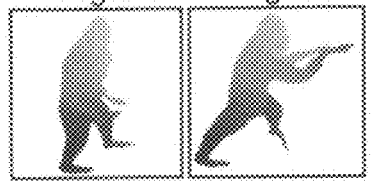
FIG. 54 shows the first frame of the PaintMapImage for the example created by FIG. 54 through FIG. 63.
FIG. 55 shows the second frame of the PaintMapImage for the example created by FIG. 54 through FIG. 63.

FIG. 54 and FIG. 55 show the PaintMapImage for this example. These are two frames of the image sequence.

Figures 57, 58:
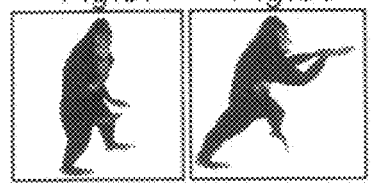
FIG. 57 shows the first frame of the ReplacementImage for the example created by FIG. 54 through FIG. 63.
FIG. 58 shows the second frame of the ReplacementImage for the example created by FIG. 54 through FIG. 63.

FIG. 57 and FIG. 58 show the ReplacementImage for this example. These are two frames of the image sequence.

Figures 60, 61:
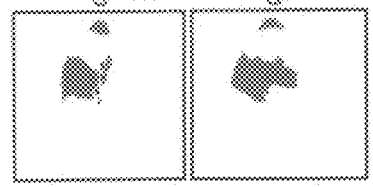
FIG. 60 shows the paint data painted by the user from the first frame from the example created by FIG. 54 through FIG. 63.
FIG. 61 shows the paint data painted by the user from the second frame from the example created by FIG. 54 through FIG. 63.

FIG. 60 and FIG. 61 show the only the visual color paint data by color that the user has brushed.

Figures 62, 63:
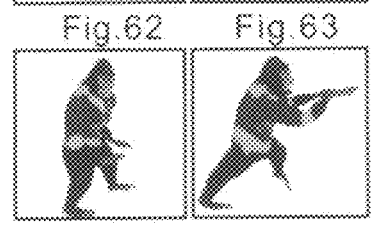
FIG. 62 shows the first frame of the Output created by the software in the example created by FIG. 54 through FIG. 63.
FIG. 63 shows the second frame of the Output created by the software in the example created by FIG. 54 through FIG. 63.

FIG. 62 and FIG. 63 show the final Output.

To explain what a contact sheet is, FIG. 3 through FIG. 7, when considered as a sequence on paper are actually a real example of a contact sheet, making a single two dimensional image using the five two dimensional images to represent an image sequence of five frames. The image sequence can be considered three dimensional, with the axis of X and Y having color values of the character, and Z being time.

Figure 64:
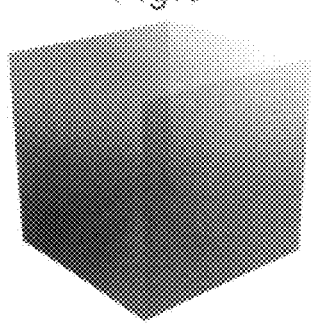
FIG. 64 shows a perspective view of the look up table.
Figure 65:
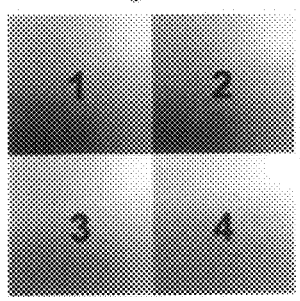
FIG. 65 shows a contact sheet of the look up table from FIG. 64.
Figure 66:
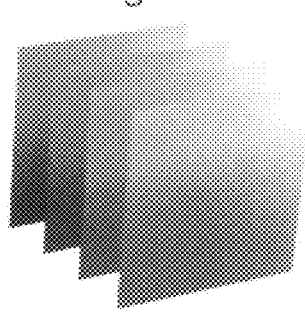
FIG. 66 shows the four planes that make up the contact sheet cut out from the three dimensional look up table of FIG. 64.

Time is the Z axis. In a contact sheet, the terms of the Z axis and time by frame number are interchangeable, so any image sequence or video can be considered three dimensional for the purposes of creating a contact sheet. The contact sheet in the software will be able to make a contact sheet from either the image sequences input, or from the look up table. FIG. 64, FIG. 65, and FIG. 66 show how the Z axis is used to make FIG. 64, which is a 3D look up table, into a contact sheet (FIG. 65).

FIG. 64 shows the spatial color's look up table in three dimensions. FIG. 66 shows it segmented into four two dimensional images. FIG. 65 shows a contact sheet of the look up table.

Figure 56:
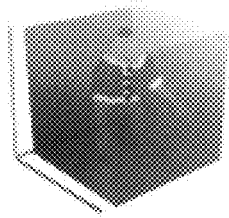
FIG. 56 is a visualization of the SentStrokes and UserStrokeColors placed in the look up table for the example created by FIG. 54 through FIG. 63.

In FIG. 59, a contact sheet of the paint data in FIG. 56, you can vaguely see the clothing painted to the character. The spatial colors make up the background of the look up table, and the visual colors are super imposed on top. The user will be able to load a contact sheet of any input or output into the Viewer at any time to paint over. When painting to the look up table, the SentStrokes will be assigned directly to the spatial color coordinates of the look up table.

Storing Paint data: UserStrokes, SentStrokes, and BrushHistory.

Figure 2:
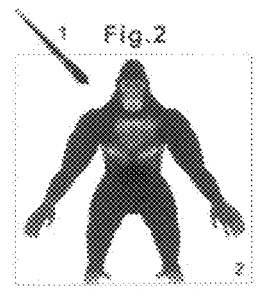
FIG. 2 shows the Viewer with it's brush tool, which is the basis for the user's painting in the software.
Figure 3:
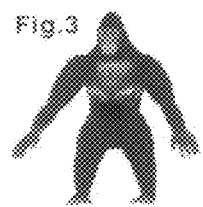
FIG. 3 shows the first frame of the ReplacementImage for the example created by FIG. 1.
Figure 4:
FIG. 4 shows the second frame of the ReplacementImage for the example created by FIG. 1.
Figure 5:
FIG. 5 shows the third frame of the ReplacementImage for the example created by FIG. 1.
Figure 6:
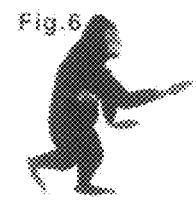
FIG. 6 shows the fourth frame of the ReplacementImage for the example created by FIG. 1.
Figure 7:
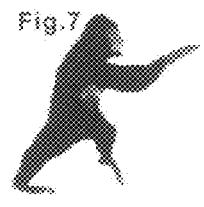
FIG. 7 shows the fifth frame of the ReplacementImage for the example created by FIG. 1.
Figure 8:
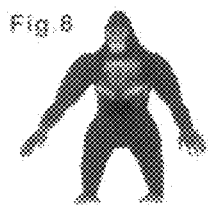
FIG. 8 shows the Output of the first frame that is first generated by the software before the paint data has been applied to the entirety of the image sequence in the example created by FIG. 1.

In the interface, the ReplacementImage will be painted using the Brush tool (FIG. 2. #1) in the Viewer (FIG. 2 #2).

The Viewer is just an interface tool that frames and shows the images the user would like to paint. It may also frame and show the Output for the user to review as they paint. The visual colors the brush stroke uses will typically be from the ReplacementImage, even when the Output is being viewed in the Viewer. The user may choose to source from the Output if they wish, perhaps for the purposes of allowing their paint strokes to appear to accumulate. By default, the ReplacementImage loads the visual colors into the Viewer, and the PaintMapImage loads the spatial colors into the Viewer. The spatial colors cannot be seen in the Viewer, but correspond with their visual color. At the positions where the user brushes, the spatial colors and visual colors are selected to create SentStrokes.

The user paints brush strokes to the Viewer by clicking and dragging. At the two dimensional coordinate of the brush stroke in the Viewer, the spatial colors of the PaintMapImage and the visual colors of the ReplacementImage are found. This is represented by figure FIG. 67, FIG. 68, and FIG. 69.

(exceptions to this will be explained in the section on Transfer Modes, further in the document)

Figure 67:
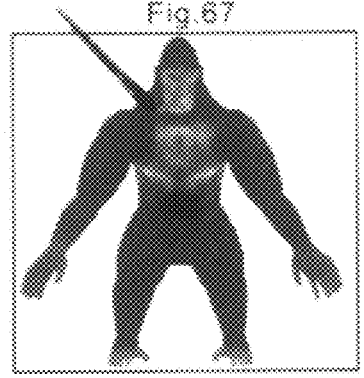
FIG. 67 shows the path of a UserStroke, represented by a red line, over the Viewer.

FIG. 67: The user paints to the Viewer with a brush

Figure 68:
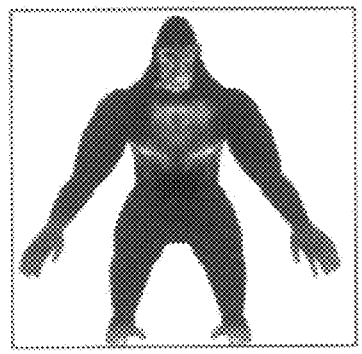
FIG. 68 shows the UserStroke's position, represented by a red line, over the colors of the ReplacementImage.

FIG. 68: The matching pixels are found in the ReplacementImage, selecting visual colors for the SentStroke(s).

Figure 69:
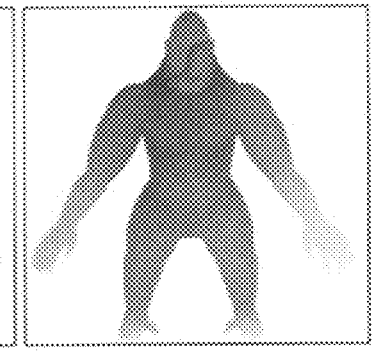
FIG. 69 shows the UserStroke's position, represented by a red line, over the PaintMapImage.

FIG. 69: The matching pixels are found in the PaintMapImage, selecting spatial colors for the SentStroke(s).

The path or paths the Brush takes across the Viewer is called a UserStroke.

The UserStroke may animate over time. The UserStroke is attached to the specific frame it is drawn to, however it may be animated to change positions and select different visual and spatial colors of that specific frame over time. Any attributes of the UserStroke in the Brush Settings may animate over time.

The spatial colors the UserStroke selects in the PaintMapImage are called the UserStrokeColors. UserStrokeColors are saved separately for every UserStroke in addition to the data of the brush's path across the Viewer. Both pieces of data are saved for each of the UserStroke's BrushSettings. The corresponding visual colors of the ReplacementImage are also saved.

Examples of UserStrokeColors are displayed in FIG. 69.

In FIG. 69, the red line represents a UserStroke.

Figure 72:
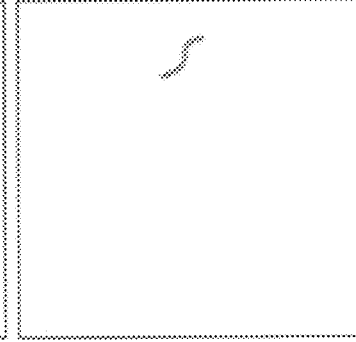
FIG. 72 shows the UserStrokeColors from the example created by FIG. 67 through FIG. 74.

The spatial colors in FIG. 72 are the UserStrokeColors.

Figure 74:
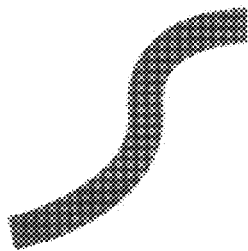
FIG. 74 shows the UserStrokeColors from the example created by FIG. 67 through FIG. 74 in close up.

In close up of FIG. 74, each pixel of the UserStroke can be seen. Each of these spatial colors is a UserStrokeColor.

The new visual colors to be paired with the UserStrokeColors are ResultingColors. ResultingColors are the visual colors that result from the interaction between the BrushColor, Stencil, ReplacementImage, and/or Output at the coordinates of the UserStroke. The Stencil may or may not be used in this interaction, which will be explained further in the document. Most often, and in this current example, the BrushColor interacts with the ReplacementImageColor to make a ResultingColor. When a ResultingColor is sent to its matching UserStrokeColor's spatial color coordinate in the look up table, the combination of these two is called a SentStroke. A SentStroke is dropped to the look up table at the spatial color coordinate of the UserStrokeColor, holding the corresponding visual color of the ResultingColor. SentStrokes have geometrically based opacity, meaning the distance from the SentStroke determines the opacity of the visual color of the SentStroke. SentStrokeOpacity determines how opaque these visual color paint strokes are when creating the Output. SentStrokes will be explained in greater detail further in the document. The SentStroke can be thought of as spherical when its spatial color is three dimensional. It will not always be three dimensional however, and the SentStroke's spatial color may have many more dimensions than three.

FIG. 70, FIG. 71, FIG. 73, and FIG. 74 shows the process of creating ResultingColors.

Figure 70:
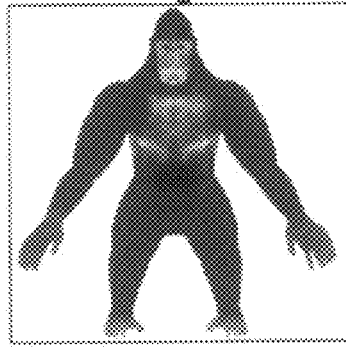
FIG. 70 shows the ResultingColors of the UserStroke from FIG. 67 created in the Viewer.

A ResultingColor is most often calculated by operating the ReplacementImageColor against the BrushColor, as shown in FIG. 70.

For example: If the Brush's color in RGB is dark red (0.2,0,0), and the Transfer Mode is ResultingColor=BrushColor+ReplacementImageColor, the ResultingColor is slightly more red than the original ReplacementImageColor. This is because the Transfer Mode, which is the user defined mathematical expression by which ResultingColors are created, is set to add the BrushColor to the ReplacementImageColor.

FIG. 70 shows the UserStroke creating ResultingColors over the ReplacementImageColors in the Viewer. The brush has been omitted from the figure. The red line across the character's face is the path of the UserStroke, illustrated by showing the ResultingColors along its path.

Figure 71:
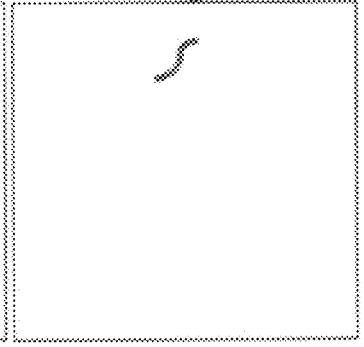
FIG. 71 shows the ResultingColors of the UserStroke isolated from the rest of ReplacementImage in the Viewer.

FIG. 71 shows the ResultingColors isolated from the rest of the visual colors in the Viewer that were not painted in this UserStroke. The ResultingColors in this example are a blend of the BrushColor and the ReplacementImageColors. They look just like the ReplacementImageColors, however more red. This is because the Transfer Mode added the red BrushColor to the ReplacementImageColors. Different Transfer Modes can achieve different results.

The Transfer Mode for the example shown in FIG. 70, FIG. 71, and FIG. 73, and FIG. 74 is ResultingColor=BrushColor+ReplacementImageColor.

The BrushColor for this example is (0.2,0,0), which is a dark red.

Figure 73:
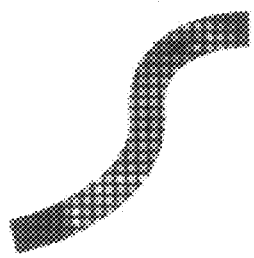
FIG. 73 shows the ResultingColors from the example created by FIG. 67 through FIG. 74 in close up.

FIG. 73 shows the ResultingColors in close up.

FIG. 74 shows the UserStrokeColors' spatial colors that correspond. Each ResultingColor will be placed to the look up table at the positions of its matching UserStrokeColor. It will be placed in the form of a SentStroke. The SentStroke will have the multidimensional spatial color coordinates of the UserStrokeColor, and the visual color paint data of the ResultingColors.

FIG. 75 through FIG. 90 show an example of a UserStroke being drawn through generating an Output.

FIG. 75 #1 shows the ReplacementImage.

FIG. 75 #2 shows the PaintMapImage.

FIG. 75 #3 shows the Vranos Node™.

FIG. 75 #4 shows the Brush History tab attached to the Vranos Node™.

FIG. 75 #5 shows the Brush Settings of this UserStroke.

In FIG. 76, the user paints a UserStroke to the Viewer, with the intention of painting a red line from the character's head, down his arm. The ResultingColors will be a mix between the OutputColors and the BrushColor. The Transfer Mode is ResultingColor=OutputColor+BrushColor; This will add the OutputColor to the BrushColor. It should also be noted that the OutputColor is first generated directly by copying the ReplacementImageColor, which is further explained by flow chart in FIG. 103.

FIG. 78 through FIG. 82 make up a 5 frame contact sheet of the look up table which shows the ResultingColors placed as SentStrokes. The spatial colors of the look up table are used for the background to help put the position of the SentStrokes' visual colors into context.

FIG. 77 shows how the spatial colors were assigned to this character's PaintMapImage. This image shows a highlight of the character's spatial colors within a look up table.

FIG. 83 shows the character's spatial color coordinates highlighted from a straight orthographic view in the look up table.

FIG. 84 shows where the visual colors of the ReplacementImage fall based on their spatial color positions from a straight orthographic view. FIG. 83 and FIG. 84 are used to help put the SentStrokes of the five frame contact sheet created by FIG. 78 through FIG. 82 into context.

FIG. 87 shows the first frame of the image input into the PaintMapImage.

FIG. 88 shows the first frame of the image input into the ReplacementImage.

FIG. 89 shows the $30^{th}$ frame of the image input into the PaintMapImage.

FIG. 90 shows the $30^{th}$ frame of the image input into the ReplacementImage.

FIG. 85 and FIG. 86 show two frames of the Output in which the new painted visual colors follow the character as he moves from frame 0 to frame 30.

BrushHistory: The BrushHistory (#4 of FIG. 75) is a tab that's attached to the bottom of the Vranos Node™, and it displays all of the user's painting data. Each UserStroke has BrushSettings which determine how to treat the UserStrokeColors, and how to make SentStrokes.

A SentStroke is a point in space that is placed in the look up table at the spatial color coordinate of the UserStrokeColor. It holds the corresponding ResultingColor, which is a visual color. SentStrokes have distance based opacity, meaning the distance from the SentStroke determines the opacity of the SentStroke's visual color, among a few other factors. Each SentStroke may have its own KeyTolerance, which is the multidimensional distance limit for the SentStroke that determines if the SentStroke is close enough to the PaintMapImage's spatial color for the PaintMapImage's corresponding OutputColor to be affected by the ResultingColor of the SentStroke.

SentStrokes may also have their own KeySoftness, which is the attenuation of the SentStroke's effects based on distance from the OutputColor's corresponding PaintMapImageColor's spatial color.

SentStrokeOpacity is a term which refers how much opacity the visual colors of the SentStrokes have at any given spatial color coordinate in the look up table. In practical terms, the SentStrokeOpacity will be very low or nonexistent at a spatial color coordinate very far from all SentStrokes. The SentStrokeOpacity will be very high or full at a spatial color coordinate very close to SentStrokes.

FIG. 91 is a three dimensional visualization of SentStrokes placed to an RGB look up table. These SentStrokes only have three dimensions for their spatial color coordinates, so they can be visualized as spherical. This is an artistic interpretation, making use of shading to show the shape and position of the spheres. When a SentStroke is three dimensional, the SentStroke may be thought of as a sphere, and the KeyTolerance can be described as the sphere's radius. The user will most often create three dimensional SentStrokes, so considering SentStrokes as three dimensional spheres can be advantageous in the user's understanding of a SentStroke's ability to select color. It is important to note however that SentStrokes may have any number of dimensions for their spatial color coordinates, so visualizing them as three dimensional is not always accurate.

When considering FIG. 91, the RGB color-space is represented by 16 planes of color. SentStrokes are the spheres. In simple terms, when the Output is created based on FIG. 91's SentStrokes, any visual colors of the Output having corresponding spatial color coordinates that fall within those SentStrokes will be fully or partially replaced with the ResultingColors of the SentStroke or SentStrokes they fall in. The SentStrokeOpacity determines how much the SentStrokes' ResultingColors affect the OutputColors. 0% SentStrokeOpacity will not affect the OutputColors, 100% SentStrokeOpacity will fully affect the OutputColors.

KeyTolerance may be scaled by each channel of spatial color.

KeyToleranceX: The scale factor the SentStroke is multiplied by on the X axis, typically red.

KeyToleranceY: The scale factor the SentStroke is multiplied by on the Y axis, typically green.

KeyToleranceZ: The scale factor the SentStroke is multiplied by on the Z axis, typically blue.

Each channel of spatial color has it's own KeyTolerance.

One advantage to this is that the user may choose a smaller KeyToleranceZ for the Blue Channel when painting to a UV based PaintMapImage. The reason is that the Blue separates objects, so each object will have an exact value of blue. A larger KeyToleranceZ in this example may result in painting on one object and accidentally affecting another. Whenever using a channel for categorization, a smaller KeyTolerance may be useful. Larger KeyTolerance values may have advantages for other purposes. One possible example of when the user may want to adjust KeyTolerance separately from the other channels is if the user is using a PaintMapImage which has the first three channels as standard spatial coordinates, and a fourth channel indicating a property of an animated object, for example, temperature. It is fairly common practice that a video representing the temperature of the object can be generated in standard three dimensional rendering software, in which the temperature of each object is present in Celsius and objects heat and cool over time. The spatial colors of this pass are directly translated, a value of 1 for 1 degree Celsius, a value of 100 for 100 degrees Celsius, etc. This render pass can be used as a fourth channel of the PaintMapImage. For example, if the user had a shot in which they wanted to write their name in bright orange on an animated cooking kettle over a fire only when the kettle was hot, they could draw their name over the kettle in a frame at which the kettle's PaintMapImage indicates a high temperature of the kettle. This would limit the paint selection to be within the three dimensional boundaries of their signature written by the UserStroke, and also to be within areas of the PaintMapImage indicating hot temperatures. As the pot cooled, the paint would disappear because the hot spatial colors representing temperature of the UserStroke would no longer match the cool temperatures of the PaintMapImage. In a situation like this, the user may want to use a small KeyTolerance for the first three dimensions of spatial colors in the SentStroke. Perhaps the KeyTolerance would be 0.001 so the SentStrokes would be accurate down to the millimeter. This assumes the three spatial dimensions are noted by their numeric value in meters. The user may want the KeyTolerance of the SentStroke's temperature channel to be much higher, perhaps 50, so the range of temperatures that glow span a wide number of degrees in Celsius. Allowing the user to adjust the radius of the SentStroke in any dimension will allow a great flexibility in creative uses of the SentStrokes.

When additional spatial color channels beyond the standard RGB are added to the PaintMapImage, additional KeyTolerance controls will be available for each channel. Additional channels will be explained further in the document.

AutoKeyTolerance: This is a setting that will override the KeyTolerance each SentStroke, making each SentStroke resize so it's large enough that its outer radius will touch the center of as many other SentStrokes as possible without overlapping any other SentStroke's centers. AutoKeyTolerance is designed to give a solid coverage between all SentStrokes by making SentStrokes large enough to span the distance to fill the gaps. AutoKeyTolerance may be turned on or off for each channel.

AutoCreateFillerSentStrokes: When this option is turned on, for any position in the look up table that is fully surrounded and enclosed by 100% SentStrokeOpacity, A SentStroke will be created for the position with a ResultingColor which is a blend of the SentStrokes nearest to it. Its KeyTolerance will be created with AutoKeyTolerance.

Figures 92, 93:
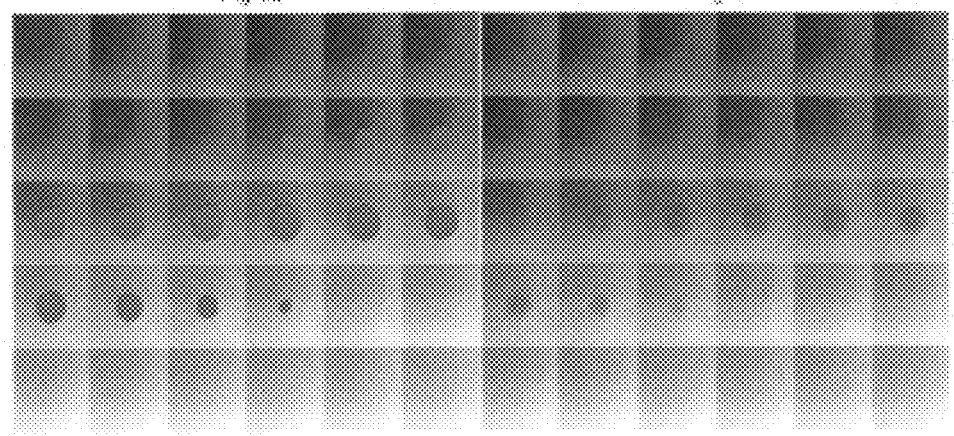
FIG. 92 shows a contact sheet of a look up table with a SentStroke with 0% KeySoftness.
FIG. 93 shows a contact sheet of a look up table with a SentStroke with 100% KeySoftness.

KeySoftness is the attenuation of the SentStrokes. This is a percentage between 0 and 100. A SentStroke with 0% KeySoftness has no attenuation, in observable terms, making a hard edge to the sphere. For a KeySoftness of 0%, at all spatial color coordinates within the SentStroke's KeyTolerance defined radius, the SentStrokeOpacity is 100%. FIG. 92 shows a contact sheet of a look up table in which the background is colored by spatial colors. The visual color red shows the sphere with a hard edge.

A SentStroke with 100% KeySoftness has an even attenuation from the center of the sphere to its edge. SentStrokeOpacity is full at the center of the sphere, and there is no SentStrokeOpacity at its edge. For SentStrokes with more than three dimensions, KeySoftness can be thought of as attenuation by distance. There is no attenuation at the coordinate that exactly matches the coordinate of the SentStroke, and full attenuation at the KeyTolerance distance away from the spatial color coordinate.

AutoKeySoftness: This setting will analyze the positions of SentStrokes. The SentStrokes that are most surrounded by other SentStrokes will have lesser KeySoftness, SentStrokes that are not as surrounded will have a higher KeySoftness.

SentStrokeOpacity refers to how greatly the SentStroke's ResultingColors influence the OutputColor. When multiple SentStrokes overlap the OutputColor's corresponding PaintMapImage spatial color coordinate in the look up table, the ResultingColor becomes a weighted average of all of the SentStrokes's ResultingColors, with the weight being the SentStrokeOpacity of each SentStroke at the OutputColor's corresponding PaintMapImage spatial color coordinate in the look up table. After the color has been determined, the SentStrokeOpacity at the coordinate is added for the final SentStrokeOpacity. If the SentStrokeOpacity is greater than 100%, it is clamped down to its maximum of 100%. This clamping process is optional, and there may be times when the user does not want to clamp. Please read further in the document on how this final calculated ResultingColor and SentStrokeOpacity will be used to create an OutputColor.

SentStrokeDefaultOpacity: This value is multiplied by the SentStrokeOpacity with the purposes of giving paint strokes greater or lesser opacity when creating the Output.

The user may make the SentStrokeDefaultOpacity differ in how much it affects each channel of visual color. For example, if the user wanted to only affect alpha values with the current UserStroke, they may set the SentStrokeDefaultOpacity for red, green, and blue to 0%, and SentStrokeDefaultOpacity for alpha to 100%.

Figure 103:
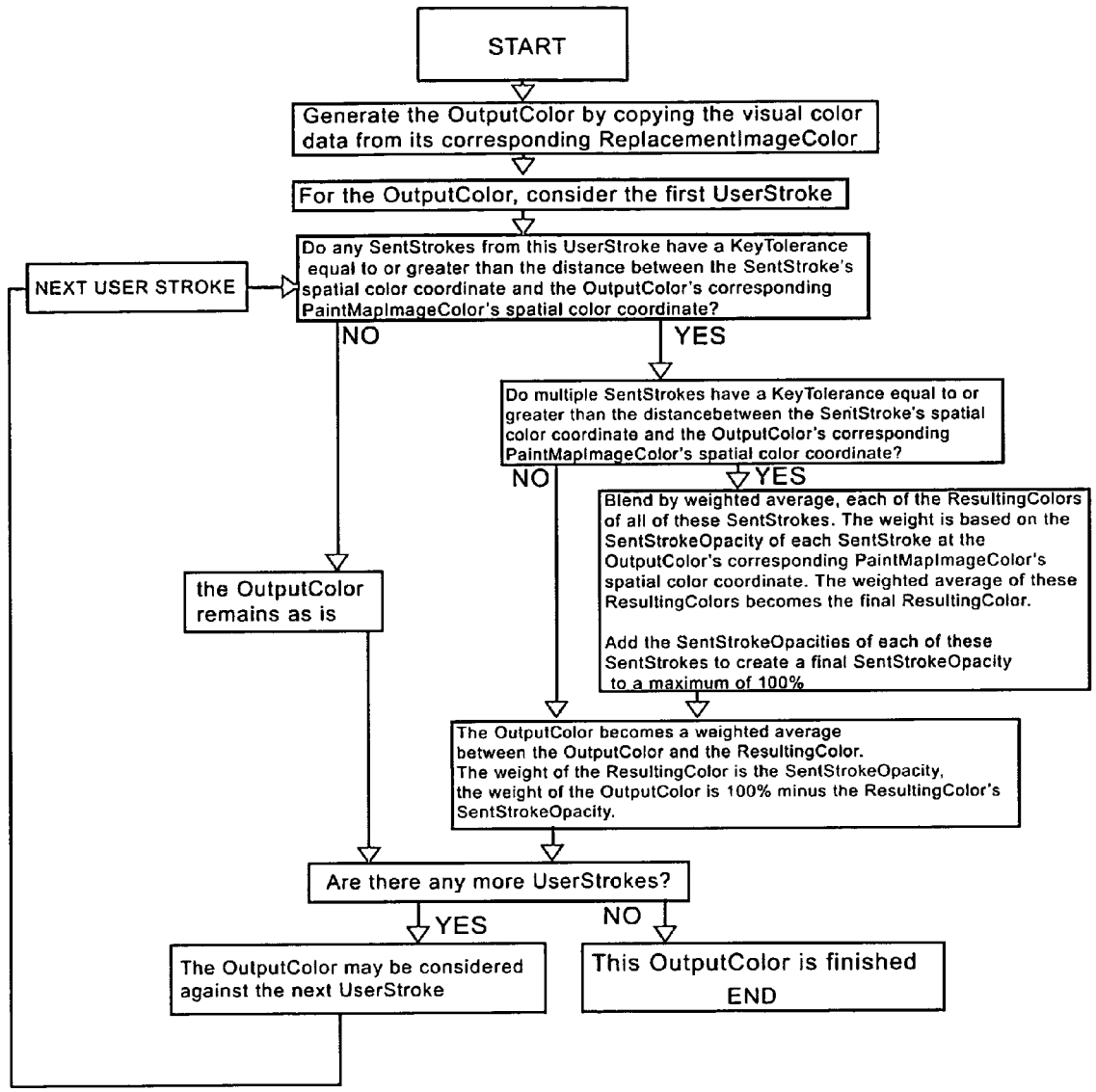
FIG. 103 shows a flowchart which explains how to generate an OutputColor.

Some BrushSettings are described above, however not all of them. Please read further in the document for more on BrushSettings.
Saving Look Up Tables:

Each individual brush stroke contains color-space data. The data is saved exclusively in each UserStroke under the ColorSpace option.
1) To create an output, the ReplacementImage becomes the starting point for the Output. The ReplacementImageColors make up the OutputColors.
2) Any OutputColor which has a corresponding PaintMapImage spatial color coordinate within the KeyTolerance distance of any SentStrokes will be modified based on SentStrokeOpacity. The spatial color's compared are first converted to the color space of the UserStroke, then the distance is found, then SentStrokeOpacity effects the OutputColor.
3) After the new OutputColors are calculated from the first UserStroke, the newly modified OutputColors become the current OutputColors of the second UserStroke. This process continues through each UserStroke throughout the Brush History. Because the OutputColors are modified one at a time and saved back to the Output, the UserStrokes may each have individual ColorSpaces. FIG. 103 explains this process by flow chart, however omits color space details.

FIG. 94 through 102 collectively make an example of several UserStrokes being applied to a character.

In these figures, a checkerboard background is used to help show the Output's Alpha channel, which is the Output's transparency.

Figure 94:
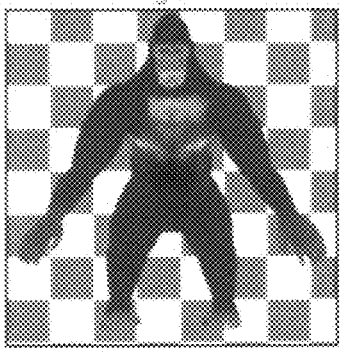
FIG. 94 shows the first frame of the Output with UserStroke1 applied in the example created by FIG. 94 through FIG. 102.
Figure 95:
FIG. 95 shows the second frame of the Output with UserStroke1 applied in the example created by FIG. 94 through FIG. 102.
Figure 96:
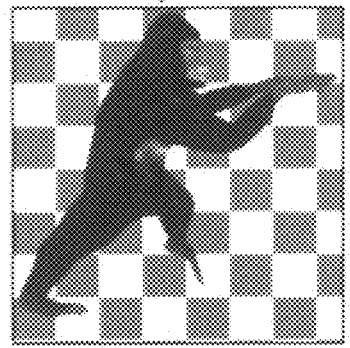
FIG. 96 shows the third frame of the Output with UserStroke1 applied in the example created by FIG. 94 through FIG. 102.
Figure 97:
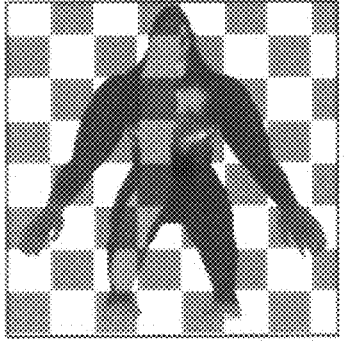
FIG. 97 shows the first frame of the Output with UserStroke1 and UserStroke2 applied in the example created by FIG. 94 through FIG. 102.
Figure 98:
FIG. 98 shows the second frame of the Output with UserStroke1 and UserStroke2 applied in the example created by FIG. 94 through FIG. 102.
Figure 99:
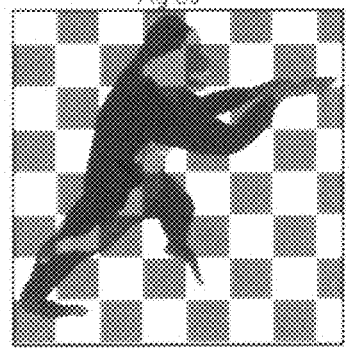
FIG. 99 shows the third frame of the Output with UserStroke1 and UserStroke2 applied in the example created by FIG. 94 through FIG. 102.
Figure 100:
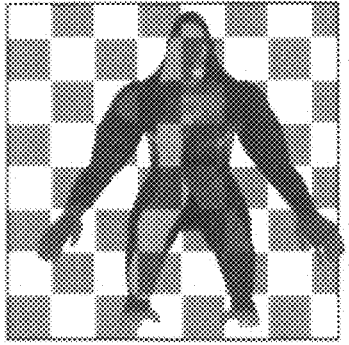
FIG. 100 shows the first frame of the Output with UserStroke1, UserStroke2, and UserStroke3 applied in the example created by FIG. 94 through FIG. 102.
Figure 101:
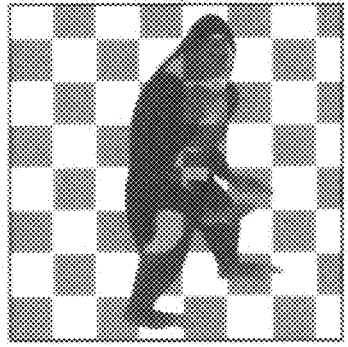
FIG. 101 shows the second frame of the Output with UserStroke1, UserStroke2, and UserStroke3 applied in the example created by FIG. 94 through FIG. 102.
Figure 102:
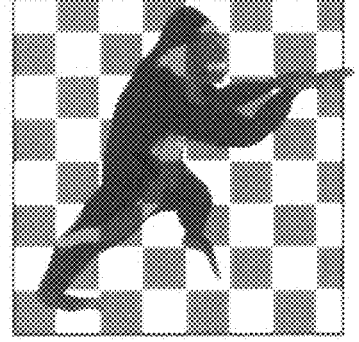
FIG. 102 shows the third frame of the Output with UserStroke1, UserStroke2, and UserStroke3 applied in the example created by FIG. 94 through FIG. 102.

FIG. 94 through FIG. 96 create a contact sheet of three frames in which the first UserStroke has been applied.

The BrushSettings for UserStroke1 are as follows.
BrushRadius: 15 pixels
BrushColor: (4,2,1)
BrushAlpha: 100%
ColorSpace: RGB > TransferMode:
> ResultingColor=BrushColor*ReplacementImageColor > AlphaTransferMode:
> ResultingAlpha=BrushAlpha*ReplacementImageAlpha FIG. 97 through FIG. 99 create a contact sheet of the second UserStroke applied to the character.

The BrushSettings for UserStroke2 are as follows.
BrushRadius: 15 pixels
BrushColor: (0,−0.5,0.5)
BrushAlpha: 50%
ColorSpace: RGB > TransferMode:ResultingColor=BrushColor+ReplacementImageColor > AlphaTransferMode:
> ResultingAlpha=ReplacementImageAlpha−BrushAlpha FIG. 100 through FIG. 102 create a contact sheet of the third UserStroke applied to the character.

The BrushSettings for UserStroke3 are as follows.
BrushRadius: 15 pixels
BrushColor: (0,0.1,0)
BrushAlpha: 75%
ColorSpace: RGB > TransferMode:ResultingColor=((ReplacementImageColor+BrushColor)*SentStrokeOpacity)+OutputColor(1−SentStrokeOpacity)

> AlphaTransferMode:ResultingAlpha=BrushAlpha(SentStrokeOpacity)+OutputAlpha(1−SentStrokeOpacity)

In UserStroke 3, the TransferMode and AlphaTransferMode may look complex, but are just standard compositing OVER or NORMAL operations, which have been used in compositing for many years. They have been modified to fit the needs of this software, considering the SentStrokeOpacity as the transparency in the expression.

BrushSettings: This section shows a continuation of the BrushSettings that were listed above in the BrushHistory. Each UserStroke has its own BrushSettings.

BrushRadius: This is the radius of the brush in two dimensions for painting to the Viewer.

BrushColor: This is the visual color of the brush. The BrushColor may be entered into the Transfer Mode when the user wants to use it to paint.

BrushAlpha: The alpha channel of the brush acts as a fourth visual color channel, and has nothing to do with the opacity of the UserStroke or SentStrokes. The Alpha value is visual color data within the SentStroke, it has no influence on the SentStrokeOpacity, despite it being an Alpha value which is typically associated with the opacity of a composite. The OutputAlpha will assume the BrushAlpha value in the look up table the same way the OutputColor assumes the ResultingColor. In summary, the SentStrokeOpacity determines how BrushColor and BrushAlpha visual color values are mixed into the Output, the BrushAlpha is just a visual color to be assigned like the BrushColor visual color. It is no different than a fourth channel of visual color.

Additional Brush Channels: The Alpha channel is a fourth channel of visual color, and any amount of additional channels of visual color may be added as well.

Transfer Mode: This is the math by which the Brush interacts with other images to create ResultingColors. The user will be able to write their own expression for transfer modes in a text box for each UserStroke. For example the user could type ResultingColor=BrushColor+ReplacementImageColor to add the BrushColor to the ReplacementImageColor. The user may also write something like ResultingColor=BrushColor+OutputColor if they want their brush strokes to have an accumulative effect. (This is explained in greater detail further in the document)

The Transfer Mode by default is set up for each channel of visual color, however if desired, the user may have an individual Transfer Mode for each channel of visual color.

Although the user may write their own expression for the Transfer Mode, many preset transfer modes will be available to create ResultingColors. Some of them are listed below.

Note: What each Transfer Mode does is described, however the exact expression may change based on its intended purpose.

Normal: Replace either the OutputColor or ReplacementImageColor with BrushColor.

Add: Add either the OutputColor or the ReplacementImageColor to BrushColor (Negative numbers are allowed in all transfer modes).

Subtract: Subtract the BrushColor from the either the OutputColor or the ReplacementImageColor.

Multiply: Multiply either the OutputColor or the ReplacementImageColor by the BrushColor.

Divide: Divide either the OutputColor or the ReplacementImageColor by the BrushColor, however it avoids dividing by zero.

Screen: Screen either the OutputColor or the ReplacementImageColor by the BrushColor. A screen is when all colors are inverted, then multiplied, then inverted again.

Difference: Create a ResultingColor which is the difference between either the OutputColor or the ReplacementImageColor and the BrushColor.

HueReplace: Convert all colors to the HSB color-space, use the BrushColor's hue value to replace either the OutputColor's hue value or the ReplacementImageColor's hue value, then convert the resulting color back to the UserStroke's color-space as the ResultingColor.

SaturationReplace: Convert all colors to the HSB color-space, use the BrushColor's saturation value to replace either the OutputColor's saturation value or the ReplacementImageColor's saturation value, then convert the resulting color back to the UserStroke's color-space as the ResultingColor.

LightnessReplace: Convert all colors to the HSB color-space, use the BrushColor's lightness value to replace either the OutputColor's lightness value or the ReplacementImageColor's lightness value, then convert the resulting color back to the UserStroke's color-space as the ResultingColor.

SpillSuppressGreen: Ignoring the BrushColor, convert either the OutputColor or ReplacementImageColor to RGB. Lower the green value to be no greater than the sum of the other two values, then convert the result back to the UserStroke's color-space.

SpillSuppressBlue: Ignoring the BrushColor, convert either the OutputColor or ReplacementImageColor to RGB. Lower the blue value to be no greater than the sum of the other two values, then convert the result back to the UserStroke's color-space.

SpillSuppressRed: Ignoring the BrushColor, convert either the OutputColor or ReplacementImageColor to RGB. Lower the red value to be no greater than the sum of the other two values, then convert the result back to the UserStroke's color-space.

Restore: Ignoring the BrushColor, replace the OutputColor with the ReplacementImageColor.

StencilOnly: Ignoring the BrushColor, replace the OutputColor with the ReplacementImageColor that has already been operated against the Stencil.

These are just a few of the Transfer Modes that will be available.

It is important to note the user can write whatever expression they want in the Transfer Mode box. If they want, they could write: ResultingColors=OutputColors+BrushColor. This would continuously modify the OutputColor, making UserStrokes to appear to accumulate. For example, painting over the same spot with red with several UserStrokes will make that spot a brighter red with each UserStroke. The user can reference any colors or data into the Transfer Mode, including PaintMapImageColors.

AlphaTransferMode: This is the Transfer Mode for the fourth channel of visual color.

ColorSpace: Each UserStroke contains the option to create SentStrokes in which the spatial colors will be compared in any color space.

Optimizations:

The possible disadvantage to the software is that after many UserStrokes have been drawn, the software may slow down. The software will need to run through every UserStroke when a new frame from the ReplacementImage is loaded. A shortcut may be put in place.

The user has the option to bake all of the data to an image sequence of their chosen color-space. This option is called ReduceAccuracyByBitDepth. This stands for Reduce accuracy by bit depth. The bake is called the BakedColorSpace.

The BakedColorSpace holds samples across the entire color-space, but not every possible color. Its spatial boundaries are determined by the greatest and least value of each channel that has greater than zero SentStrokeOpacity. It is essentially a resolution based look up table.

The BakedColorSpace also contains a SentStrokeOpacity map, called the SentStrokeOpacityMap, which is just an additional channel to the BakedColorSpace. It maps the SentStrokeOpacity values over the BakedColorSpace. Any spatial color positions with a SentStrokeOpacityMap value of zero may be skipped when creating an OutputColor, because no SentStrokes have ever influenced that position. If there are different SentStrokeDefaultOpacities for each channel, there will be a different SentStrokeOpacityMap for each channel, however if the SentStrokeDefaultOpacity remains at 100% for all channels, a single SentStrokeOpacityMap is suitable because the SentStrokeOpacity of each channel will be equal anyway.

This BakedColorSpace will supersede the UserStrokes, ignoring all UserStrokes ordered before the BakedColorSpace in the BrushHistory. When an OutputColor is created considering the BakedColorSpace as opposed to a UserStroke, its PaintMapImage spatial color coordinate match will be found in the BakedColorSpace, and the OutputColor will be partially or fully replaced by the visual color of the BakedColorSpace at the spatial color coordinate.

If the exact spatial color coordinate value is not present in the BakedColorSpace, weighted averages determine the new visual color values for the OutputColor and OutputAlpha. The weight is based on the closeness by proximity of the most similar spatial colors of the BakedColorSpace to the desired spatial color. The visual colors of these nearby spatial colors are averaged based on this weight.

The BakedColorSpaceLayer would become a new layer in the BrushHistory, coming before or after the UserStrokes depending on the User's choice. It could be moved at any time. Any UserStrokes before the BakedColorSpaceLayer would be ignored, instead starting the Output colors from their look up in the BakedColorSpace. UserStrokes coming after the BakedColorSpaceLayer would be calculated normally, starting from the OutputColor.

When ReduceAccuracyByBitDepth is turned on, individual UserStrokes are still saved.

ReduceAccuracyByBitDepth has several options.

AccColorSpace: This is the color-space chosen for the BakedColorSpace, for example, it may be RGB, HSB or any known color-space. All colors at the chosen bit depth of this color-space will be run through the entire Brush History and saved to the BakedColorSpace.

Note: Color depth is infinite, so above, "All colors" as stated above refers to taking a sampling across the entire range of each channel spatially in the color space.

AccBitDepth: This is the spatial bit depth of the BakedColorSpace. For example, 8-bit is 256 values per channel of color.

Optionally, the user may store each spatial channel of the BakedColorSpace at a different bit depth. This option is called AccBitDepthPerChannel. The new option boxes would read AccBitDepthChannel#, with the # sign standing for the channel number. There would be as many AccBitDepthChannel#s as there were spatial channels in the color-space. Most often there would be 3 spatial color values, red green and blue.

For example, if the user wanted 256 values of red to be saved, 1024 values of green to be saved, and 2 values of blue to be saved in the RGB color-space, the user would turn on AccBitDepthPerChannel. AccBitDepthChannel0, for red would be set to 8. AccBitDepthChannel01 would be set to 10 and AccBitDepthChannel02 to 1. The user could also set any channel to OFF, which would stop any data from being saved to that channel.

The user could save and load BakedColorSpace's at any time as an image or image sequence.

In summary, the BakedColorSpace is an image sequence. It saves the value of every visual color created by the SentStrokes to the spatial position of the BakedColorSpace. The spatial color positions of the visual colors are determined by the coordinates in the image sequence.

If desired, rather than use a specific bit depth, the user may choose a finite number of values for either spatial colors and visual colors in the BakedColorSpace.

The user would have the option to enable ContinuouslyUpdateBakedColorSpace. With this option, the BakedColorSpaceLayer would always be moved to the last layer, updating the Output based only on the BakedColorSpace. Each new UserStroke would update the BakedColorSpace. The spatial color coordinates of the BakedColorSpace would be found, and SentStrokes would be applied.

Discarding Data:

In some cases, the user would not want to save brush data. The user could turn on a setting called OnlyBakedColorSpace. As each brush stroke was drawn, it would be applied to the BakedColorSpace. The BakedColorSpace would become the only form of save data for the look up table.

DeleteStroke: A function will be created to delete individual UserStrokes. UserStrokes may also be copied and pasted, and moved in layer order at any time. Their animation keys may be copied, pasted, or moved as well.

InsertNewBakedColorSpaceLayer: This option allows the user to make a new BakedColorSpaceLayer, which holds its own BakedColorSpace. It may be efficient to do broad paint strokes in a BakedColorSpace with a very low bit depth, then to use another BakedColorSpace with a higher bit depth to make finer strokes. The user may then use UserStrokes for the finest detail.

Painting Look Up Tables, and Viewer Modifications:

The user may at times want to examine either their look up table or BakedColorSpace, and see how the UserStrokes have affected it. The user may want to make paint adjustments directly to the look up table.

UserStrokes are typically drawn to the ReplacementImage in the Viewer, but the user may load the look up table itself into the Viewer in the form of a Contact Sheet. This will be explained further in the document.

Additional BrushSettings for UserStrokes:

BlurFactor: The BlurFactor is how much the UserStroke will blur the visual colors in the look up table. This is typically set to 0. The blur calculates within the look up table, sampling visual colors spatially from within the BlurRadius. The BlurRadius is the spatial radius in the look up table by which each visual color will blur with, and is not a radius to be confused with the KeyTolerance radius.

If the user desired only to blur a spatial area containing visual colors of the look up table, and not to paint new visual colors, the user would choose the following BrushSettings, and would draw a UserStroke over the area in the look up table.

BrushRadius: 1
BrushColor: (irrelevant)
BrushAlpha: (irrelevant)
ColorSpace: RGB TransferMode:ResultingColor=OutputColor AlphaTransferMode:ResultingAlpha=OutputAlpha BlurFactor=(any positive number)
SentStrokeOpacity: 100%
KeyTolerance: (A number high enough to surround the trouble area)
KeySoftness: (any percentage)
BlurRadius: (The radius by which all colors within should blur. A radius of 0.1 would be a rather large blur)

Contact Sheets:

Each Viewer has settings allowing it to generate a contact sheet from whatever image or image sequence it is viewing.

The user may have multiple Viewers, allowing them to paint to both their footage, and the look up table.

When the contact sheet is turned on, it will still follow the rules regarding the ReplacementImage and the PaintMapImage. For example, if the user is painting to frame 7 of the ReplacementImage in the form of a contact sheet, the SentStrokes would be generated exactly the same as if they painted to frame 7 of the ReplacementImage without a contact sheet.

Figure 123:
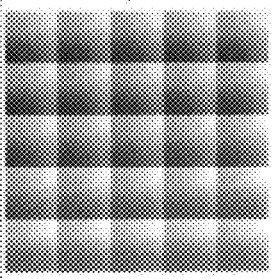

The user may choose to load the look up table itself into the Viewer in the form of a contact sheet. If this is the case, the spatial colors of the look up table would temporarily be the PaintMapImage, and the visual colors of the look up table after every SentStroke was applied would temporarily become the ReplacementImage. This allows the user to paint their look up table while looking at the visual color paint data on it. It may look similar to FIG. 141 in which the SentStrokes' visual colors can be seen super imposed over the spatial colors. In the example of painting visual colors of FIG. 141 as the ReplacementImage, the PaintMapImage would look like FIG. 123. FIG. 123 is the same contact sheet however with no SentStrokes applied, showing only spatial colors.

This will allow the user to paint SentStrokes directly to the look up table. After they are done painting, the PaintMapImage and ReplacementImage may revert to the previous inputs.

The contact sheet may be generated by certain criteria.

ContactColorSpace: The color space of the contact sheet.

Horizontal squares: The number of horizontal rows of the contact sheet.

Vertical squares: The number of vertical columns of the contact sheet.

Starting Value 0: The spatial color value the first channel begins at.

Ending Value 0: The spatial color value the first channel ends at.

Starting Value 1: The spatial color value the second channel begins at.

Ending Value 1: The spatial color value the second channel ends at.

Starting Value 2: The spatial color value the third channel begins at.

Ending Value 2: The spatial color value the third channel ends at.

The contact sheet's frames will be at equal intervals between the starting and ending spatial color values of each channel. The intervals will be determined by the amount of frames in the contact sheet.

FIG. 123 is an example of a contact sheet with the following values.

ContactColorSpace: RGBA
Horizontal squares: 5
Vertical squares: 5
Starting Value 0: 0
Ending Value 0: 1
Starting Value 1: 0
Ending Value 1: 1
Starting Value 2: 0
Ending Value 2: 1

In this examples, values 0, 1, and 2 are red, green, and blue. The user may paint to this contact sheet.

FIG. 150 is a contact sheet in the HSB space with the following values:

ContactColorSpace: HSB
Horizontal squares: 6
Vertical squares: 5
Starting Value 0: 0
Ending Value 0: 360
Starting Value 1: 0
Ending Value 1: 1
Starting Value 2: 0
Ending Value 2: 1

The HSB contact sheet is more intuitive to look at and paint than the RGB contact sheet. The colors are organized by hue, which is easier to understand for some artists.

Additional channels may be added to the contact sheet.

Any color space may be used for the contact sheet.

Stencil:

Every Viewer has the ability to load a Stencil.

A Stencil is a two dimensional image that is composited over the ReplacementImage in the Viewer.

This composite operation is temporary, and does not change the ReplacementImage file from which the image is being loaded. The intended purpose behind the Stencil is that sometimes the user would like to quickly add patterns and textures to their paint work. Without the Stencil, the user would have to texture a frame of the ReplacementImage, load it into the software, then create a UserStroke selecting the new texture. They would then have to revert the textured frame of the ReplacementImage back to the original, then reload it back into the software. It would take more work than should be necessary, so the Stencil allows a temporary composite with the ReplacementImage for texturing. The Stencil may be easily removed afterward, and may be used for other purposes.

Using the Stencil, the Stencil is composited with the ReplacementImage. These new visual colors will serve as the ReplacementImageColors when the UserStroke is drawn, without harming or changing the file from which the ReplacementImage came from.

Figure 104:
FIG. 104 shows the ReplacementImage in the Viewer of the example created by FIG. 104 and FIG. 109.

For Example:

In FIG. 104, the user wants to paint a camouflage pattern onto this character. Normally the user would expect to paint this by hand, line by line.

(We may assume the Vranos Node™ is properly configured with a suitable PaintMapImage)

Figure 105:
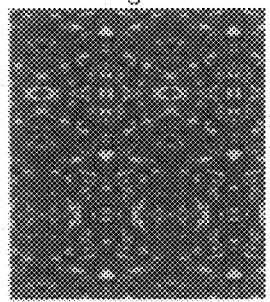
FIG. 105 shows the image of the Stencil of the example presented between FIG. 104 and FIG. 109.
Figure 106:
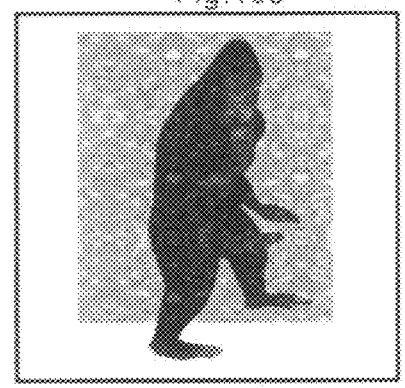
FIG. 106 shows the Stencil composited over the ReplacementImage in the Viewer for the example created by FIG. 104 and FIG. 109.

The user may load the texture in FIG. 105 as a Stencil, and composite it over the ReplacementImage using a StencilTransferMode. In FIG. 106, the Stencil is composited over with a Normal Transfer Mode, The StencilTransferMode gives the Stencil 50% opacity over the ReplacementImage.

The user may now paint a UserStroke over the Viewer. The composite between the Stencil and the ReplacementImage makes up a new ReplacementImage.

These ResultingColors are dropped to the look up table through SentStrokes, and this camouflage texture is now painted on the character throughout the entire Output. After the user is done painting, the user may de-activate the Stencil, and no changes have been made to the file of the ReplacementImage.

In summary, the Stencil is just a way to manipulate visual colors before creating SentStrokes.

Figure 107:
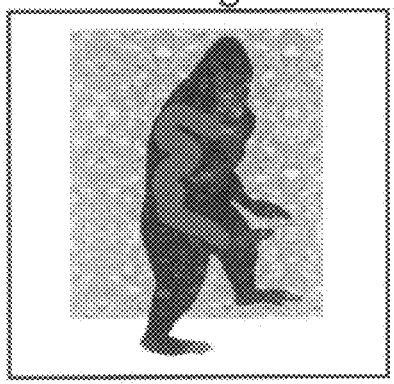
FIG. 107 shows the path of the UserStroke, represented by a red line over the Viewer in the example created by FIG. 104 and FIG. 109.

FIG. 107 shows the path of the UserStroke in red over the Viewer.

Figure 108:
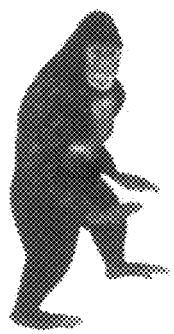
FIG. 108 shows the first frame of the Output that results from the example created by FIG. 104 and FIG. 109.
Figure 109:
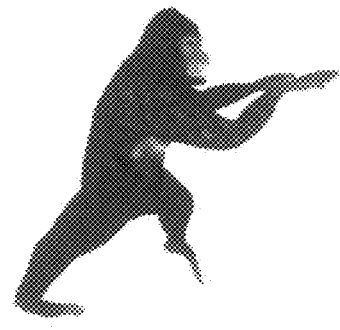
FIG. 109 shows the second frame of the Output that results from the example created by FIG. 104 and FIG. 109.

FIG. 108 and FIG. 109 show the camouflage pattern sticking to the character over the image sequence.

Because the ResultingColors are stored with the UserStroke, it does not matter if the Stencil is shut off, moved, or if the original file it came from is deleted after the UserStroke has been created. The Stencil's transformations are saved with the UserStroke, as well as the StencilTransferMode and data to tell the software which file was used for each input at the time of the UserStroke. This will allow the user to change the BrushHistory later on to make adjustments, as well as animate attributes over time. The idea is any and all data that can be saved will be saved to ensure there are multiple ways to retrieve data that may go missing.

Live Action footage: Keying and Color Correcting with The Vranos Node™

The user may choose to key and color correct using the Vranos Node™. Keying is changing the transparency values of the visual colors for specific spatial colors. Color correction is changing the color values of visual colors for specific spatial colors.

FIG. 142 through FIG. 145 make up a contact sheet of video of a green screen shot that must be keyed and color corrected. The green must be removed, and the green spill, which is a term that refers to green reflections on the foreground, must be changed from green to more natural colors.

FIG. 146 through FIG. 149 make up a contact sheet of a video that shows the final Output from the Vranos Node™, in which the green has been removed by assigning a visual color alpha value of zero to green spatial colors. Transparency of this visual color is represented by a gray and white checkerboard pattern. The visual colors from FIG. 142 through FIG. 145 have also been adjusted in FIG. 146 through FIG. 149 to eliminate any green spill. Non green visual colors were assigned at green spatial color coordinates. This was done using the Vranos Node™.

The user must connect the footage from FIG. 142 to a Vranos Node™. This footage will be input into the PaintMapImage Input and the ReplacementImage Input. This makes the visual colors and spatial colors identical, so each spatial color can receive a new visual color by using SentStrokes.

Typically live-action footage will be keyed and color corrected by connecting the footage to both the PaintMapImage and the ReplacementImage, however not always.

Sometimes the user may wish to use other software as a starting point for keying and color correction, before using the Vranos Node™. The user may wish to make broad and simple adjustments to visual colors, like contrast, or color grades before doing precise touch ups with the Vranos Node™. In that case, the user would input their already keyed and color corrected footage into the ReplacementImage input, and they would input their original unchanged footage into the PaintMapImage input. This will allow the user to make tweaks to a shot they've already begun keying or color correcting from another software. The advantage to using the original footage in the PaintMapImage is that none of the color data has been damaged by color correction. For example, if the user were to color correct the greens to gray, the user wouldn't be able to select just the greens in the Vranos Node™. This is because there would be no more greens, there would only be grays in their place. The problem is if there are grays in the foreground, and now the grays in the background where the green was, when the user selects the grays from the background to key out, they will also select the grays from the foreground. This would limit the selection ability. Using the original footage preserves all the original values. The visual colors entered into the ReplacementImage may be modified by other software without much problematic consequence, but it is possible to have problematic consequences when modifying spatial colors of the PaintMapImage, which will almost always be best off preserved as they were initially created.

FIG. 122 through FIG. 141 show the process of keying and color correction.

FIG. 122 is a frame of the original footage.

FIG. 123 shows the spatial colors of the look up table in a 5×5 contact sheet for FIG. 122. In this case, because the PaintMapImage and ReplacementImage are the same video, the visual colors and spatial colors are identical. It is less important to specify between visual colors and spatial colors for this example because the values are exactly the same anyway, so the distinction will not always be made throughout explanation.

Figure 124:
Figure 125:
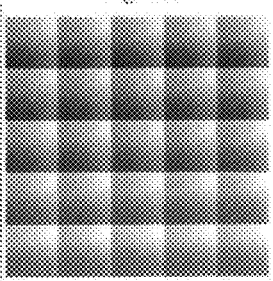

FIG. 124 shows the first UserStroke drawn with a large brush over the footage to select visual color greens from the ReplacementImage in the Viewer, which also selects spatial color greens from the PaintMapImage in the Viewer.

Figure 126:
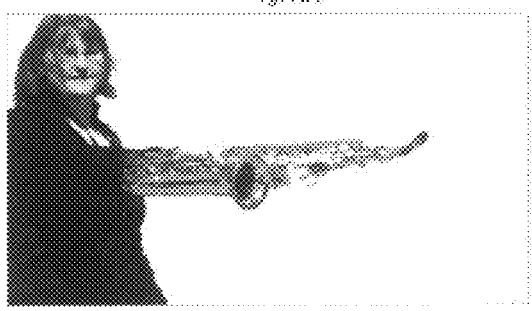
Figure 127:
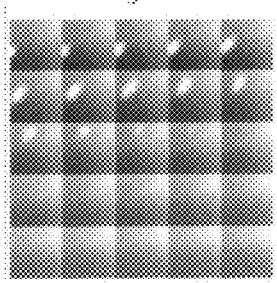

FIG. 126 shows the result of a UserStroke being applied based on the brush path from FIG. 124. The Brush Settings for this UserStroke1 are as follows:
BrushRadius: 70 pixels
KeyTolerance: 0.078
KeySoftness: 0.8
BrushColor: (0,0,0)
BrushAlpha: 100%
ColorSpace: RGB > TransferMode:
>     ResultingColor=ReplacementImageColor
>
> AlphaTransferMode:
>     ResultingAlpha=ReplacementImageAlpha−
>     BrushAlpha FIG. 127 shows the contact sheet of the look up table after UserStroke1 has been applied. It can be seen that the greens of the contact sheet have been made transparent, and the selection (SentStrokeOpacity) attenuates the transparency softly from the greens to the other colors. The user may paint directly to the look up table if desired.

Figure 128:
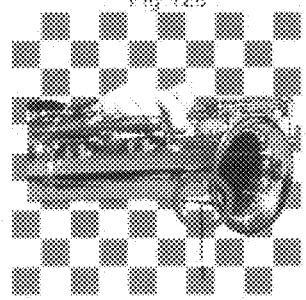

FIG. 128 is a close up of the saxophone over a checkerboard to show transparency of the visual colors.

FIG. 128 #1 shows a red circle indicating a problem with FIG. 128. The problem is that some of the saxophone has been removed because the spatial color bronze-greens containing visual color bronze-greens of the saxophone's reflection fell within the keyTolerance defined distance of the spatial color pure-greens of the SentStrokes created by UserStroke1.

Figure 129:
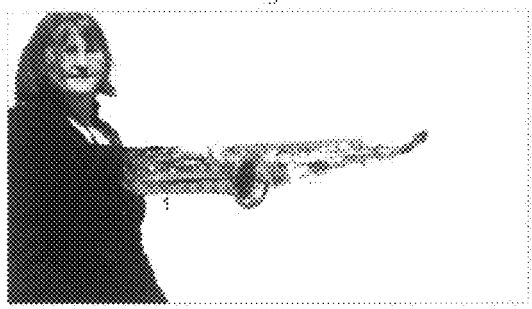
Figure 130:
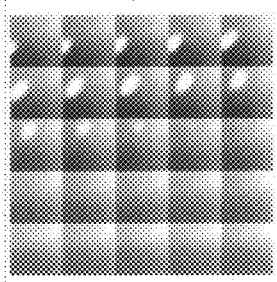

FIG. 129 shows the selection from UserStroke2. The red dots, FIG. 129 #1, are the UserStroke. The purpose is to select the spatial colors from the areas of the saxophone that have been removed, and to assign a opaque visual color alpha values at those spatial color locations in the look up table. The Brush Settings of UserStroke2 are as follows:
BrushRadius: 20 pixels
KeyTolerance: 0.02
KeySoftness: 0.8
BrushColor: (0,0,0)
BrushAlpha: 100%
ColorSpace: RGB > TransferMode:
>     ResultingColor=ReplacementImageColor
>
> AlphaTransferMode:
>     ResultingAlpha=ReplacementImageAlpha+
>     BrushAlpha The result as shown in close up by FIG. 133 #1 is that the saxophone has been restored. This may be compared to FIG. 128 #1 where part of the saxophone was keyed. By using SentStrokes that subtract visual color alpha in UserStroke1, and SentStrokes that add visual color alpha in UserStroke2, the user may quickly and easily key visual colors out, then finely restore small ranges of visual colors they did not intend to key out. The SentLineSegment is also a perfectly valid solution for the same problem, which will be introduced later in the document.

The difference between the look up tables as represented by FIG. 127 and by FIG. 132 is subtle, however the saxophone visual color bronze-greens that were keyed in FIG. 127 now are fully opaque again in FIG. 132.

FIG. 134 #1 shows the brush path of UserStroke3. The purpose of this UserStroke is to select the green reflections in the hair, and change them to match the rest of the hair. The Brush Settings of UserStroke3 are as follows:
BrushRadius: 20 pixels
KeyTolerance: 0.8
KeySoftness: 0.8
BrushColor: (0.35,0.17,07)
BrushAlpha: 100%
ColorSpace: RGB > Transfer Mode:ResultingColor=Replace Hue
>
> AlphaTransferMode:ResultingAlpha=OutputAlpha The brush color becomes an orange-red, which is an exact color taken from the character's hair. The Transfer Mode "Replace Hue" converts both the BrushColor and each ReplacementImageColor to the HSB color space. Then it replaces the hue value of the ReplacementImageColor with the hue value of the BrushColor. It converts the result back to RGB, which will become the ResultingColor.

The AlphaTransferMode indicates that the Alpha visual color values should not be changed further, and what values are currently there shall remain for this UserStroke.

FIG. 136 shows UserStroke3 applied to the footage. It has successfully converted the spill colors to orange-reds to match the rest of the hair. It may be compared to FIG. 131. The KeyTolerance was large enough to enclose the spill in the saxophone, and to successfully change it to acceptable colors. Looking closely, it can be seen that there are no green reflections anywhere in the image. The look up table with UserStroke3 applied can be seen in FIG. 137. It can be seen that at the spatial color position of many greens are now visual color orange-reds. The look up table may be compared to FIG. 135 for a before and after comparison.

FIG. 138 #1 shows UserStroke4, which selects the spatial colors of the hair. This is one extra step only for the purposes of showing the Vranos Node™ may be used for Secondary Color correction, which may include stylistic changes. In FIG. 140, UserStroke4 has been used to replace the colors of the hair with a blue Hue. The contact sheet FIG. 141 shows visual color blues over the spatial color positions of red, orange and green. Previously these spatial color positions held visual color values that were equal to their spatial color values, now the visual color values have a blue hue.

The SentLineSegment:

The SentLineSegment will primarily be used with live action footage input into the Vranos Node™.

Within every UserStroke, the user may create TargetColors. Target colors are spatial color coordinates. When there is a TargetColor or multiple TargetColors, SentStrokes will be replaced with SentLineSegments. SentLineSegments are simply selections, just like SentStrokes. Their purpose is to create distance based multidimensional boundaries in the look up table for SentStrokeOpacity. SentLineSegments use KeyTolerance and KeySoftness the same way as SentStrokes do. The difference is that a SentStroke is based off of a point in space, and a SentLineSegment is based off of a line segment spanning between two points in space. One point of the line segment is placed at the each of the SentStrokes' spatial color coordinates in the look up table. The SentLineSegments extend as a line segment to all TargetColors' spatial color coordinates in the look up table. The purpose is to allow the user to make a selection relationship between the UserStrokeColors and the TargetColors. Put simply, the user may want their paint to have effects that attenuate evenly from one range of spatial colors to another range of spatial colors. They also may want their paint to have effects that span with full opacity from one range of spatial colors to another range of spatial colors. SentLineSegments allow the SentStrokeOpacity to attenuate from every UserStrokeColors' positions to every TargetColors's positions in the look up table. The direction of attenuation may be reversed along the line segment, and the attenuation may be further modified by the user.

The SentStrokeOpacity of the SentLineSegment is determined by a bar in the UserStroke's Brush Settings. This bar represents the SentStrokeOpacity change starting from the spatial color of the SentStroke and ending at each spatial color of the TargetColor. The user maps the opacity to that bar, called the SentLineSegmentOpacityBar. It defaults to full opacity at the position of each SentStroke, making a SentLineSegment that attenuates evenly to zero SentStrokeOpacity at the spatial color position of each TargetColor.

FIG. 116 shows the SentLineSegmentOpacity in the UserStroke. In the example, the SentStrokeOpacity will be 0% at any UserStrokeColors' spatial color coordinates, and will be 100% at each of the TargetColors' spatial color coordinates, with a line segment spanning from each UserStrokeColor's spatial color coordinates to each TargetColor's spatial color coordinates with the SentStrokeOpacity change noted in the SentLineSegmentOpacity.

For example, FIG. 110 is a green screen shot in which the objective is to turn the green screen to purple. The visual color green must be changed to the visual color purple. This can be achieved by placing the visual color purple at the spatial color green.

FIG. 110 #1: Inside the white circle are the spatial color reds the user would sample as UserStrokeColors.

FIG. 110 #2: Inside the magenta circle are the color greens the user would sample as TargetColors.

FIG. 111 shows a close up of the edge between the red shirt and the green screen. In FIG. 111, the brush settings of FIG. 115 have been used, with no SentLineSegment. It should also be noted that the preset Transfer Mode of replace Hue has been used, and the Transfer Mode is not shown in this example.

In both FIG. 111 and FIG. 112, only one color has been sampled for the UserStrokeColor and one color has been sampled for the TargetColor to make the look up tables of FIG. 113 and FIG. 114 more readable. FIG. 113 is the look up table for FIG. 111, and FIG. 114 is the look up table for FIG. 112. BrushSettings from FIG. 115 apply to the UserStroke in the look up table in FIG. 113. BrushSettings from FIG. 116 apply to the UserStroke in the look up table in FIG. 114.

FIG. 112 shows a close up of the edge between the red shirt and the green screen with the brush settings of FIG. 116, using a SentLineSegment. In FIG. 116, SentLineSegements is turned on. In FIG. 115, SentLineSegments is turned off.

It can clearly be seen that the edge between colors has a much more acceptable attenuation when a SentLineSegment is used.

FIG. 113 show the UserStroke of FIG. 115 applied to the look up table. Proportions and positions have been slightly manipulated to make the figure easier to see. The SentStroke has full SentStrokeOpacity, and it is located at the spatial color greens, with visual color purples. The spatial color reds have no SentStrokeOpacity, and the spatial colors in between red and green have no SentStrokeOpacity. Because the spatial colors in between red and green have no SentStrokeOpacity, the edge of the sleeve, which is made up of colors that are a mix of red and green have not been modified at all by the SentStroke.

FIG. 114 shows the UserStroke of FIG. 116 applied to the look up table with a single SentLineSegment. Proportions and positions have been slightly manipulated to make the figure easier to see. The spatial color greens are fully covered by the visual color purple SentStroke with full SentStrokeOpacity. The spatial color reds have no SentStrokeOpacity, leaving them as is, and the spatial color yellows and oranges in between green and red have some SentStrokeOpacity, making a smooth and desirable color mapping.

FIG. 115 shows the UserStroke settings applied to the footage in FIG. 111.

FIG. 116 shows the UserStroke settings applied to the footage in FIG. 112. The SentLineSegment is turned on. FIG. 116 #1 points to the position on the SentLineSegmentOpacityBar that shows the SentStrokeOpacity of the UserStrokeColor. FIG. 116 #2 points to the position on the SentLineSegmentOpacityBar that shows the SentStrokeOpacity of the TargetColor. Black represents no SentStrokeOpacity, White represents full SentStrokeOpacity, the grays in between represent partial SentStrokeOpacity. The SentStrokeOpacity attenuates from one end of the line segment to the other.

Note: In the example presented between FIG. 110 through FIG. 116, the TargetColor is listed in the BrushHistory. The user may choose to select TargetColors by selecting from the Viewer with the Brush Tool, in which case there may be hundreds of TargetColors. If there are hundreds of TargetColors, the user will most likely not want to see each TargetColor in the UserStroke's BrushSettings. They will be able to be hidden.

Another use of the SentLineSegment would be with live-action footage to quickly change the hues of the green screen background to match the hues of the foreground. In this example, an image sequence of green screen footage is input into the PaintMapImage, and the ReplacementImage.

Using the Stencil intelligently, the user can make a hue relationship between each individual UserStrokeColor and each individual TargetColor. The user could use the ReplacementImage also as the Stencil so the brush would assume the hue of the ReplacementImage. The Stencil places the foreground colors directly over the same foreground colors of the ReplacementImage in the Viewer. This allows the user to sample the hue of the foreground just by creating a UserStroke over the foreground. They would have to use the Hue Transfer Mode, with Target Colors of the green screen background. The result would be that a SentLineSegment would assume the visual color hue of the foreground and apply it to all colors between the foreground color and the green along the path of the SentLineSegment.

More capabilities of TargetColors:

TargetColors are spatial colors, but may also be assigned their own visual color.

The SentStroke's visual color is the ResultingColor. By default, the TargetColor's visual color is also the ResultingColor. The software would also allow the option of a TargetColorResultingColor, which would be a separate visual color for the TargetColor. There would have to be additional transfer modes for each channel of the TargetColor. This means that along the SentLineSegment, in addition to changing SentStrokeOpacity, the visual colors may also change from one end to another.

Color Matching UserStrokes:

When color correcting using the painting abilities of the Vranos Node™, the user may want to match one visual color to another visual color without just replacing the first color with an opaque SentStroke. The best way to color correct smoothly would be to find the difference between the first visual color and the second visual color by multiplication, and to multiply the first visual color so it matches the desired color. Assuming the PaintMapImage and ReplacementImage are made up of identical colors, the spatial color that is equal in value to the first visual color would be assigned a SentStroke which multiplies each visual color within its KeyTolerance by the amount needed to multiply the first visual color to match the second visual color.

The user would set the Transfer Mode to ResultingColor=ReplacementImageColor*BrushColor, and set the BrushColor to the correct multiplier that would yield the desired color. Then the user would simply draw a UserStroke over the color the user would like to change.

To make this process simpler, choosing the BrushColor may be done automatically.

The user may select a FromColor, and a ToColor.

FromColor: The visual color the user wants to color correct.

ToColor: The visual color the FromColor should match.

In FIG. 117, the user will use the gray card from FIG. 117 to balance the color to FIG. 118. In FIG. 117, the gray card is even between the red channel and green channel at approximately 0.35, but the blue channel is too high, at approximately 0.7.

The user finds or designates a FromColor by sampling the gray card from FIG. 117, for example, RGB (0.35,35,0.7)

The user then finds or designates a ToColor. The color they would like the FromColor to be is RGB (0.35,0.35,0.35). They would manually enter this knowing that by making each RGB value equal, it yields an unbiased gray, which is the intended color of any gray card. (0.35,0.35,0.35) becomes the ToColor.

After selecting the FromColor and the ToColor, the BrushColor automatically becomes RGB (1,1,0.5). This is the number that must be multiplied by the FromColor to make it match the ToColor.

$$(0.35, 0.35, 0.7) \times (1, 1, 0.5) = (0.35, 0.35, 0.35)$$

To match the shot from FIG. 117 to FIG. 118, the user may create a SentStroke with the multiply transfer mode at the spatial color position exactly equal to the FromColor's visual color. The KeyTolerance must be made large enough to enclose every spatial color in the footage. In FIG. 117, the user may choose a KeyTolerance of 100. It is assumed that all values of this footage are normal, meaning they fall between 0 and 1, making 100 easily large enough. The result of this UserStroke is that FIG. 117 will look like FIG. 118.

The user could make this process easier on themselves by loading a Stencil of the shot they would like to match which contains a neutral gray card. This would allow them to sample the FromColor from the ReplacementImage, and the ToColor from the Stencil which has been composited over the ReplacementImage in the Viewer. Once a BrushColor has been created, the user would be ready to paint. The user could just remove the Stencil and begin color correction by painting UserStrokes.

The user may use the Transfer Mode if they wish to make this process more accurate. For example, they may include the FromColor and ToColor in the Transfer Mode if they wish. The user may write:

ResultingColor=OutputColor*(ToColor/FromColor)

One of the issues with multiplication is that multiplying by 0 always yields zero, so a black color can never be corrected by multiplication. The Transfer Mode will allow the user to write an expression to compensate for this. For example, the user may write an expression that will take any color that is below 0.1 and add it by the necessary difference between the FromColor and the ToColor. They may take any color above 0.1 and multiply it by the number needed to match the FromColor to the ToColor. The best solution may be to blend between the two in an expression in the Transfer Mode.

Color Correction Using the Stencil:

The user may wish to solve a number of color correction problems with the Vranos Node™. One of the common problems is matching two Macbeth color checkers to grade between shots. The user may load the shot with the visual colors they wish to correct into the PaintMapImage, and also into the ReplacementImage. The visual colors and spatial colors of these two inputs will be identical.

The user may then load an image of the Macbeth color checker from the shot they'd like to match to as a Stencil into the Viewer and have the Stencil's visual colors overlap their corresponding ReplacementImage visual colors. The goal is to put the desired visual colors of the Stencil on top of the visual colors of the ReplacementImage. Because the visual colors of the ReplacementImage match the spatial colors of the PaintMapImage, when the visual colors of the Stencil are assigned at the spatial color coordinates of the PaintMapImage, the ReplacementImage's visual colors will match the Stencil's visual colors when creating an Output.

The user may change the Transfer Mode to a preset transfer mode called "StencilMatch". This transfer mode will multiply any visual colors in the look up table that are in spatial range of the SentStroke by the RGB value that is necessary to multiply the ReplacementImageColor to the color which is the result of compositing the ReplacementImageColor with the StencilColor. In this case, the StencilColor will be composited with a Normal StencilTransferMode in the Viewer, cleanly replacing the visual colors of the ReplacementImage with the visual colors of the Stencil.

The user may sample every visual color of the Macbeth color checker in the Viewer for that UserStroke. With AutoKeyTolerance set to ON, each SentStroke will be created large enough to reach the nearest SentStroke's spatial color coordinate. The result is that SentStrokes are created that multiply the ReplacementImageColors to match the StencilImageColors. Every other color in the look up table will be a blend of the SentStrokes that are nearby. This method allows the user to quickly make a look up table that grades from one Macbeth color checker to another Macbeth color checker.

This method also may be very useful with left and right eye stereoscopic color matching. Each UserStroke will have an option called GradeBySentStrokes. With GradeBySentStrokes turned on, every visual color in the look up table will be affected by the SentStrokes based on distance from the nearby SentStrokes. The value calculated will be determined by the Output color's proximity to SentStrokes, and will be a weighted average based on distance. This method will allow colors outside of the KeyTolerance to be color graded. It will force every visual color to change.

FIG. 119 #1 shows the footage the user would like to color correct.

FIG. 119 #2 is a duplicate of the same footage from FIG. 119 #1.

FIG. 119 #3 shows the footage input into the ReplacementImage input.

FIG. 119 #4 shows the footage input into the PaintMapImage input.

FIG. 119 #5 is the Vranos Node™.

FIG. 120 shows the ReplacementImage loaded into the Viewer, with the brush ready to paint.

FIG. 121 is the Stencil of the desired color correction. Notice that the color checker matches in shape and proportion, so when composited as a Stencil in the Viewer, the corresponding visual colors line up.

The user would simply composite the Stencil with a Normal StencilTransferMode over the ReplacementImage in the Viewer, then sample each square of the color checker. They would turn on GradeBySentStrokes, and the shot would be color corrected in the Output.

Additional Channels

SentStrokes have been visually explained as 3 dimensional spheres in the figures, however this is only because visualizing anything in the fourth dimension is impractical. SentStrokes may have an unlimited number of dimensions because the distance between spatial colors in the look up table is determined by the distance equation Each SentStroke does not need to be limited to three dimensional coordinates; it may actually have an unlimited number of dimensions for spatial color coordinates, and visual color channels.

The advantage to thinking of a SentStroke as a 3 dimensional sphere is that it can be seen and understood through pictures.

The problem with thinking of a SentStroke as a 3 dimensional sphere is that it limits the user to Red, Green, and Blue only. It is very likely the user will also want to use Alpha. They may also want to use additional channel data gathered from special cameras that have a fourth channel of infrared light. As new cameras are invented, perhaps more than four channels will be gathered. SentStrokes must accommodate this.

KeyTolerance must not necessarily be thought of as a three dimensional radius, but defined as a measure of distance, which can be calculated with any number of dimensions.

The distance equation to describe the distance between any spatial color in the look up table and a SentStroke's spatial color in three dimensions is as follows:

$$d = \sqrt{(A_1-A_2)^2 + (B_1-B_2)^2 + (C_1-C_2)^2}$$

$A_1$ is the red value of the spatial color
$B_1$ is the green value of the spatial color
$C_1$ is the blue value of the spatial color
$A_2$ is the red value of the SentStroke's spatial color
$B_2$ is the green value of the SentStroke's spatial color
$C_2$ is the blue value of the SentStroke's spatial color If the user desires, they may input a PaintMapImage with any number of channels. For example, instead of three channels of RGB, they may input four channels, RGBA. (Red Green Blue Alpha).

$$d = \sqrt{(A_1-A_2)^2 + (B_1-B_2)^2 + (C_1-C_2)^2 + (D_1-D_2)^2}$$

One skilled in the art will understand that distance between two points in multidimensional space has a similar equation, depending on the square of the distances between the points in each dimension.

The PaintMapImage, ReplacementImage, and the SentStrokes do not necessarily need to have the same number of channels. By default, the PaintMapImage has three channels of spatial colors, Red, Green, and Blue. The ReplacementImage has four channels of visual color, Red, Green, Blue and Alpha. The user may add an unlimited number of channels to the ReplacementImage, PaintMapImage, Stencil, or BrushColor. The amount of spatial and visual channels do not have to match.

When there are more than 3 channels of visual color in the ReplacementImage, Stencil, or BrushColor, the user may wish for each channel of visual color to have its own Transfer Mode. The user may choose to have individual Transfer Modes for each channel. Some users may wish to have individual Transfer Modes with three or less channels, which will also be possible.

Final Overview:

The user loads an image sequence into the PaintMapImage to gather spatial color coordinate data for the SentStrokes. SentStrokes will have as many channels for their spatial coordinates as there are channels in the PaintMapImage.

The user loads the ReplacementImage into the Viewer with the intention of painting to it, or changing its visual colors.

The user creates a UserStroke by drawing over the ReplacementImage. SentStrokes will contain visual color paint data.

The SentStroke may have an unlimited number of channels from either input. The data from the PaintMapImage, called the UserStrokeColor, is the spatial color coordinate data for the SentStroke.

To create an Output of visual colors, after UserStrokes have been created, the software first finds the first OutputColor. The OutputColor's visual color is first generated by copying over the visual color values of the ReplacementImageColor. The software then finds the corresponding PaintMapImageColor's spatial color in the look up table. It uses the distance equation to determine if the PaintMapImageColor's spatial color is within the KeyTolerance distance of any SentStrokes. SentStrokes normally get their KeyTolerance from the UserStroke's KeyTolerance setting, however if AutoKeyTolerance is turned on in the UserStroke, each SentStroke may have a different KeyTolerance.

The SentStrokeOpacity at the spatial color coordinate of the PaintMapImage's spatial color coordinate is determined by the distance to the SentStrokes or SentLineSegments. KeySoftness of the SentStrokes or SentLineSegments, and a variety of other settings also influence SentStrokeOpacity.

The visual color that will be blended against the current OutputColor to create the new OutputColor is a weighted average between the ResultingColors of the SentStrokes, based on their SentStrokeOpacity at the PaintMapImageColor's spatial color coordinate. The total SentStrokeOpacity determines the blend between the current OutputColor and the new OutputColor when creating an Output.

Please refer to FIG. 103 for a flow chart explaining how to generate any given OutputColor.

As used herein, a hypercube may refer to a multidimensional cube and/or data array. For example, a 4-cube hypercube may be a four-dimensional data array. A spatial color, as used herein, may, for example, have five dimensions, three of which represent three-dimensional physical location and two of which represent additional features (such as "dryness" or "texture" or any other quantifiable data that is variable and/or continuously variable), and the possible range of values from which the spatial color is selected may be represented by a five-dimensional hypercube. Further, a hypercube may also refer to a multidimensional object in which the dimensions do not all necessarily have the same length or number of gradations (e.g., unit length). For instance, a five-dimensional hypercube from which a spatial point is selected may include three dimensions having, e.g., 256 gradations each, one dimension having, e.g., 100 gradations, and the final dimension having, e.g., 500 gradations. Each of these dimensions could be normalized, as understood in the art, to a unit length, recognizing that each dimension may provide a differing number of possible gradations.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of changing colors in a video, comprising:
providing a paint map image video comprising multidimensional location information of spatial points of an animated object in a multidimensional animation, the spatial points represented by different spatial colors, each spatial color comprising shades of multiple linearly independent colors, whereby each spatial point of the animated object is represented by a unique spatial color, and whereby successive frames of the paint map image video show animation of the animated object with changing multidimensional location information of the spatial points with the location information of the spatial points remaining spatially relative to the animated object;
providing a rendered replacement image video that has been rendered from the multidimensional animation of the animated object, the rendered replacement image video comprising visual colors, each visual color comprising a transparency and shades of multiple linearly independent colors;
identifying a first replacement image location on the animated object in a frame of the replacement image video, the first replacement image location having a first visual color;
based at least in part on the step of identifying the first replacement image location, identifying a first paint map image location corresponding to the first replacement image location in a corresponding frame of the paint map image video, the first paint map image location represented by a first spatial color;
creating a color mapping function that maps the first spatial color to a visual color different than the first visual color; and
providing an altered rendered replacement image video that has been rendered according to the color mapping function.

2. The method as claimed in claim 1, wherein the color mapping function maps the first spatial color to a visual color having a different transparency than the first visual color.

3. The method as claimed in claim 1, wherein the color mapping function maps the first spatial color to a visual color having zero transparency.

4. The method as claimed in claim 1, wherein the color mapping function maps the first spatial color to a visual color having a different shade of at least one of the multiple linearly independent colors than the first visual color.

5. The method as claimed in claim 1, wherein the multiple linearly independent colors comprise exactly three linearly independent colors.

6. The method as claimed in claim 1, wherein the color mapping function maps the first spatial color and all spatial colors within a color radius to at least one visual color different than the first visual color.

7. The method as claimed in claim 6, wherein the color radius is between approximately 0.01% and 1% of a maximum shade of one of the multiple linearly independent colors of the spatial colors.

8. The method as claimed in claim 6, further comprising adjusting the color radius in at least one dimension.

9. The method as claimed in claim 1, wherein the color mapping function maps the first spatial color and all spatial colors within a color radius to at least one visual color different than the first visual color according to an attenuation that depends at least in part on a distance from the first spatial color.

10. The method as claimed in claim 1, wherein the color mapping function maps the first spatial color and all colors within a color radius to exactly one visual color different than the first visual color.

11. The method as claimed in claim 1, wherein the color mapping function maps the first spatial color and all colors within a color radius to visual colors that depend at least in part on a user-defined mathematical expression.

12. The method as claimed in claim 1, wherein the color mapping function comprises a hypercube and maps the first spatial color and all colors within a closed shape within the hypercube to at least one visual color different than the first visual color.

13. The method as claimed in claim 12, wherein the closed shape is created by enclosing all points within a distance from a line segment.

14. The method as claimed in claim 1, wherein the color mapping function comprises a hypercube and maps the first spatial color and all colors within a closed shape within the hypercube to at least one visual color different than the first visual color according to an attenuation that depends at least in part on a distance from the first spatial color.

15. The method as claimed in claim 14, wherein the closed shape is created enclosing all points within a distance from a line segment and the attenuation increases with increased distance from the line segment.

16. The method as claimed in claim 14, wherein the closed shape is created enclosing all points within a distance from a line segment and the attenuation increases from a beginning of the line segment to an end of the line segment.

17. The method as claimed in claim 1, wherein the multi-dimensional location information of the spatial points of the animated object has a resolution, and wherein the color mapping function is smaller than a mapping function required to map all spatial colors at the resolution.

18. A system for changing colors in a video, comprising:
a machine; and
a program product comprising machine-readable program code for causing, when executed, the machine to perform the method as claimed in claim 1.

19. A method of changing colors in a video, comprising:
providing a paint map image video in which multidimensional color data may be re-interpreted as multidimensional location data, each color converted to an identical spatial location color comprising shades of multiple linearly independent colors, whereby each spatial point location may be used to contain visual color data;
providing a rendered replacement image video comprising of visual colors, each visual color comprising shades of multiple linearly independent colors;
identifying a first replacement image location of the video in a frame of the replacement image video, the first replacement image location having a first visual color;
based at least in part on the step of identifying the first replacement image location, identifying a first paint map image location corresponding to the first replacement image location in a corresponding frame of the paint map image video, the first paint map image location represented by a first spatial color;
creating a color mapping function that maps the first visual color to a second visual color different than the first visual color; and
providing an altered rendered replacement image video that has been rendered according to the color mapping function.

20. A system for changing colors in a video, comprising:
a machine; and
a program product comprising machine-readable program code for causing, when executed, the machine to perform the method as claimed in claim 19.

* * * * *